US009647748B1

(12) United States Patent
Mitchell

(10) Patent No.: US 9,647,748 B1
(45) Date of Patent: May 9, 2017

(54) GLOBAL BROADBAND ANTENNA SYSTEM

(71) Applicant: Rockwell Collins, Inc., Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 236 days.

(21) Appl. No.: 13/775,725

(22) Filed: Feb. 25, 2013

Related U.S. Application Data

(63) Continuation-in-part of application No. 13/746,036, filed on Jan. 21, 2013.

(51) Int. Cl.
*H04B 7/185* (2006.01)

(52) U.S. Cl.
CPC .................. *H04B 7/1851* (2013.01)

(58) Field of Classification Search
None
See application file for complete search history.

(56) References Cited

U.S. PATENT DOCUMENTS

| | | | |
|---|---|---|---|
| 6,201,797 B1 | 3/2001 | Leuca et al. | |
| 6,697,850 B1 * | 2/2004 | Saunders | 709/219 |
| 6,804,514 B2 * | 10/2004 | Wiedeman et al. | 455/427 |
| 6,941,138 B1 * | 9/2005 | Chang et al. | 455/427 |
| 6,952,580 B2 * | 10/2005 | Chang et al. | 455/427 |
| 7,068,616 B2 * | 6/2006 | Chang et al. | 370/316 |
| 7,103,317 B2 * | 9/2006 | Chang et al. | 455/66.1 |
| 7,280,498 B1 * | 10/2007 | Mitchell | 370/316 |
| 7,352,331 B2 * | 4/2008 | Quagliaro | 343/705 |
| 7,450,901 B2 * | 11/2008 | Parkman | 455/12.1 |
| 8,010,127 B2 * | 8/2011 | Burtner et al. | 455/456.1 |
| 8,504,019 B2 | 8/2013 | Lynch et al. | |
| 2001/0032254 A1 | 10/2001 | Hawkins | |
| 2002/0137509 A1 * | 9/2002 | Laufer et al. | 455/427 |
| 2003/0041155 A1 * | 2/2003 | Nelson | H04B 7/18506 709/230 |
| 2003/0167257 A1 | 9/2003 | de Bonet | |
| 2007/0283262 A1 | 12/2007 | Pally | |
| 2008/0263601 A1 * | 10/2008 | Hebb | H04H 20/02 725/68 |
| 2009/0010200 A1 | 1/2009 | Lauer et al. | |

(Continued)

OTHER PUBLICATIONS

Nishiyama et al., Load Balancing and QoS Provisioning Based on Congestion Prediction for GEO/LEO Hybrid Satellite Networks, Proceedings of the IEEE, vol. 99, Issue 11, Nov. 2011, pp. 1998-2007.

*Primary Examiner* — Donald Mills
(74) *Attorney, Agent, or Firm* — Angel N. Gerdzhikov; Donna P. Suchy; Daniel M. Barbieri

(57) ABSTRACT

An antenna system for a vehicle. The antenna system includes at least one antenna, wherein each of the at least one antenna is configured to send signals to and receive signals from one or more non-geostationary satellites. Additionally, the antenna system includes at least one directional antenna, wherein each of the at least one directional antenna is configured to receive signals from one or more geostationary satellites. Furthermore, the at least one antenna and the at least one directional antenna are configured to be communicatively coupled to a computing device on-board the vehicle.

37 Claims, 26 Drawing Sheets

(56) References Cited

U.S. PATENT DOCUMENTS

| | | | |
|---|---|---|---|
| 2010/0060517 A1* | 3/2010 | Nichols | H01Q 21/0025 342/357.29 |
| 2012/0016980 A1 | 1/2012 | Rothschild | |
| 2012/0194399 A1* | 8/2012 | Bily | H01Q 13/28 343/772 |
| 2012/0300815 A1* | 11/2012 | Tronc | 375/147 |

* cited by examiner

US 9,647,748 B1

GLOBAL BROADBAND ANTENNA SYSTEM

CROSS-REFERENCE TO RELATED APPLICATIONS

The present application claims the benefit under 35 U.S.C. §120 of U.S. patent application Ser. No. 13/746,036, filed Jan. 21, 2013, entitled "Programmable Satellite Radio". U.S. patent application Ser. No. 13/746,036 is herein incorporated by reference in its entirety.

TECHNICAL FIELD

The present disclosure generally relates to the field of vehicle data and communications systems, and more particularly to antenna systems of vehicles configured to communicate via satellites.

BACKGROUND

Currently, two-way satellite data communication between an aircraft and satellites uses an antenna system communicating with one particular satellite in both transmit and receive directions. Typically, antenna systems configured for two-way communication have limited bandwidth requiring that antennas be physically larger than most small- and mid-sized aircraft can accommodate. Furthermore, even larger-sized aircraft, which can accommodate such antennas configured for two-way communication, suffer from the effects of significant drag (and consequently, higher fuel consumption rates) on the aircraft.

Therefore, it would be advantageous if a smaller antenna system existed which would provide at least a relatively high bandwidth, which would be suitable to be equipped upon small- to mid-sized aircraft as well as larger aircraft, and which would improve fuel consumption.

SUMMARY

An embodiment includes an antenna system for a vehicle. The antenna system includes at least one antenna, wherein each of the at least one antenna is configured to send signals to and receive signals from one or more non-geostationary satellites. Additionally, the antenna system includes at least one directional antenna, wherein each of the at least one directional antenna is configured to receive signals from one or more geostationary satellites. Furthermore, the at least one antenna and the at least one directional antenna are configured to be communicatively coupled to a computing device on-board the vehicle.

An additional embodiment includes an antenna system for a vehicle. The antenna system includes at least one multi-band directional antenna. The at least one multi-band directional antenna is configured to receive signals from one or more first-band geostationary satellites over a first band and to receive signals from one or more second-band geostationary satellites over a second band.

A further embodiment includes an antenna system. The antenna system includes a curved electronically scanned array panel. The curved electronically scanned array panel includes a plurality of amplifier elements distributed over an area of the curved electronically scanned array panel. The curved electronically scanned array panel is configured to receive signals from one or more geostationary satellites. One or more curvatures of an underside of the curved electronically scanned array panel correspond to one or more curvatures of a portion of a surface of a vehicle.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
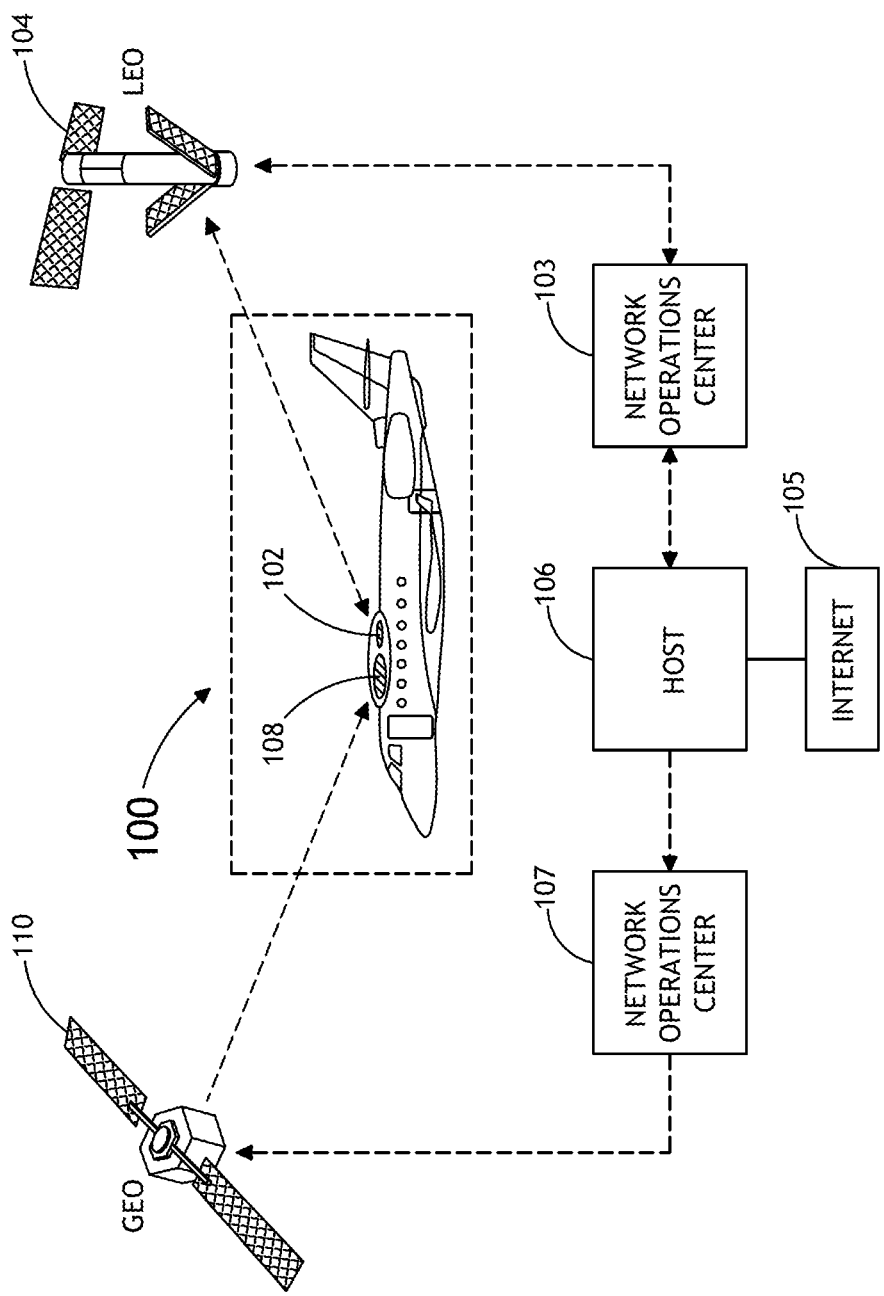
FIG. 1 shows a diagram of an aircraft satellite communications system.

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Embodiments of the invention include an antenna system for a vehicle, wherein the antenna system is configured to split inbound and outbound communications between two or more satellite systems. In some embodiments, the antenna system includes at least one antenna (such as at least one partial omni-directional antenna) and at least one directional antenna (such as at least one electronically scanned array panel antenna). In such embodiments, a particular partial omni-directional antenna of the antenna system is configured to send signals to and receive signals from one or more non-geostationary satellites (such as low earth orbit (LEO) satellites (e.g., a constellation of low earth orbit satellites) as LEO satellites traverse LEO orbits). Additionally, in such embodiments, a particular directional antenna of the antenna system is configured to receive signals from one or more geostationary (GEO) satellites in view of a location of the antenna system. In some embodiments, a particular directional antenna can be implemented as a curved electronically scanned array panel, wherein one or more curvatures of an underside of the curved electronically scanned array panel corresponds to one or more curvatures of a portion of a surface of an aircraft. In some embodiments, the particular directional antenna may not be configured to transmit; for example, the particular directional antenna can be configured as a receive-only directional antenna such that the size of the particular receive-only directional antenna is smaller than a size needed to achieve a required beam-tightness for a similar directional antenna configured to transmit and receive. Embodiments of the antenna system are configured to transmit outgoing data via at least one LEO antenna (such as a partial omni-directional antenna) to at least one LEO satellite (or at least one LEO satellite constellation system); the antenna system is further configured to receive incoming data via a GEO antenna (such as a directional antenna (e.g., an electronically scanned array panel)) from at least one GEO satellite. Embodiments of the antenna system are further configured such that the at least one partial omni-directional antenna and the at least one directional antenna are communicatively coupled to a computing device on-board a vehicle via wired connectivity, cabled connectivity, wireless connectivity, and/or any other connectivity suitable for communications or data transfer. That is, in some embodiments, the computing device couples the outbound data (e.g., bursts, streams, or packets) being sent to a LEO satellite network with incoming data (e.g., bursts, streams, or packets) received from a GEO satellite (or GEO satellite network). For example, the computing device can be configured to coordinate or direct incoming data received from the internet via a GEO antenna with outgoing data from a client device (on-board the aircraft) which is to be sent to a LEO satellite via a particular LEO omni-directional antenna. In some embodiments, the computing device comprises a networking device (such as a split proxy computing device) where the outgoing and incoming IP addresses will differ.

Additionally, embodiments of the invention include at least one multi-band directional antenna (such as a dual-band directional antenna, triple-band directional antenna, or the like). Embodiments include each multi-band directional antenna being configured to receive multiple streams of signals simultaneously (or approximately simultaneously) or non-concurrently, wherein the multiple streams of signals at least includes a stream of signals on a first particular band (e.g., a particular portion of a band spectrum) and a stream of signals on a second particular band (e.g., a particular portion of a second band spectrum). Each of the streams of signals are received from a particular GEO satellite; that is, a particular multi-band antenna is configured to receive multiple channels, transponders or signals from multiple GEO satellites (e.g., receiving a stream of signals on a first band from a first GEO satellite and receiving a stream of signals on a second band from a second GEO satellite). In some embodiments, a multi-band directional antenna is configured for receiving streams (e.g., electromagnetic beams) of signals on a $K_u$ band and a $K_a$ band. In other embodiments, the multi-band directional antenna is configured for receiving streams of signals on two or more of an L band, a $K_u$ band, or a $K_a$ band. Furthermore, embodiments of the invention include a multi-band antenna being configured to receive multiple streams of signals, wherein two or more of the signals are in portions of a same band spectrum. For example, in some embodiments the multi-band directional antenna is configured to receive two streams of signals, where the streams of signals are both in the $K_a$ band or both in the $K_u$ band; in some instances, this occurs when a first stream of signals of a particular band (e.g., $K_a$, $K_u$, or the like) has a first polarization orientation (e.g., left-hand polarized or vertical polarized, or the like) and a second stream of signals on the same particular band (e.g., $K_a$, $K_u$, or the like) has a second polarization orientation (e.g., right-hand polarized or horizontal polarized, or the like). While particular exemplary bands are disclosed, embodiments of the invention fully contemplate that a particular multi-band directional antenna can be implemented and configured to receive any suitable portion of any suitable band of signals from GEO satellites.

While embodiments of the invention are specifically disclosed as being implemented on aircraft, it is fully contemplated that embodiments of the invention can be applied to or implemented with other vehicles, such as land vehicles (e.g., automobiles, tanks, trains, trailers, or the like), water vehicles (e.g., boats, submarines, or the like), amphibious vehicles (e.g., hovercrafts or the like), other air vehicles (e.g., helicopters or the like), or space vehicles (e.g., spaceships, rockets, or the like).

Current aircraft systems for providing internet and other communications on small to mid-sized aircraft provide few if any antenna options for providing adequate speeds in both directions. This is because current aircraft antenna systems capable of providing relatively fast two-way connection speeds require a relatively large size aperture in order to meet the directivity, which small to mid-sized aircraft cannot accommodate. As such, for example, current systems for providing internet and other communications and entertainment onboard a small to mid-sized aircraft may not provide the speed that is required for high speed internet browsing and other internet applications.

Currently, implementations of communication systems intended for larger aircraft (which are not usable on most smaller and mid-sized aircraft) have drawbacks. For example, current aircraft communications system may include a transmitter and a receiver for communicating with a geostationary orbit (GEO) satellite. When available to aircraft, GEO satellites are able to provide a relatively fast connection speed (as compared to a connection speed of current LEO satellites) for internet, data, television, or other entertainment. However, the physical size of a GEO antenna required for transmitting to a GEO satellite is typically very large; for example, the diameter of a GEO antenna configured for transmitting can exceed 30 inches. A transmit/receive antenna having a 30-diameter is not practical on smaller aircraft. Because of the large-size requirement for a GEO antenna configured to transmit, currently implemented antenna systems configured for transmitting and receiving can have a size in excess of approximately 3 feet wide by 6 feet long. Installing a currently implemented system on a smaller or mid-sized aircraft having a fuselage in the range of approximately 4.5 feet to 6 feet would markedly impede aircraft performance, if not render a particular aircraft unable to perform its advertised service range or inoperable.

At best, currently implemented antenna systems add aerodynamic drag, increase fuel costs, and reduce a distance a particular aircraft can travel.

In some instances, a required size of an antenna can be approximated based upon a relationship between required antenna gain in association with the required link margin, noise-temperature, and area based on electromagnetic wavelength. For example, a relationship between antenna gain and antenna size can be determined from the following formula:

$$\frac{G}{T} \approx \frac{4\pi(\text{Area of Antenna})}{(\lambda^2)T}$$

where G represents the gain of the antenna, T represents the noise-temperature, and $\lambda$ represents the wavelength. Thus, antennas requiring greater gain, such as the gain and directivity required to transmit to a geostationary orbit satellite will generally be expected to be larger than antennas having smaller gain requirements.

Currently, due to size constraints, small aircraft are limited to using bandwidth-limited two-way antennas which fail to provide a fast enough connection to handle data-rich applications, such as receiving content of a web page or display of media. Currently implemented antennas transmit signals to and receive signals from LEO satellites. While LEO antennas can be smaller (e.g., approximately three inches in diameter and one inch in height) than a GEO antenna, the LEO antenna is typically limited in bandwidth delivering much slower data service than GEO satellites (e.g., 10 or 100 times slower). Antennas for transmitting signals to and receiving signals from a LEO satellite are typically implemented as a partial omni-directional antenna rather than larger directional antennas for communicating with GEO satellite systems. An important distinction is noted, the use of omni-directional antennas is unique to mobile LEO satellite terminals because their lower Earth orbit requires less transmit power and antenna gain and the moving constellation of satellites, requires constant handoff and communication with more than one satellite. This uniquely enables a smaller, broader beam antenna than a corresponding GEO transmit antenna system.

A partial omni-directional antennas used for LEO satellite communications can be approximately three inches in diameter and approximately one inch tall; however, currently, the connection speed provided by LEO satellite systems is much slower than the connection speed provided by GEO satellite systems and is not be capable of providing a high enough downlink for high speed internet.

In addition, many existing aircraft communication systems fail to provide communications seamlessly across the globe. For example, existing systems may not be functional in certain areas of the globe including regions beyond 70 degrees north or south latitude, such as regions over the North Pole. This important region is commonly used for flights between North America and Europe or Asia.

Another problem that may be faced by current systems for providing communications onboard an aircraft relates to the need for a backup system in the event of a communications system failure. For example, some aircraft may require an entirely separate back up system in case the primary system fails. Current HF (high frequency) radio systems provide backup but atmospheric anomalies and use congestion make this less than dependable. An additional problem faced by current systems may include limited functionality for use on the ground. For example, existing air-to-ground communications systems may work when the aircraft is in flight where there is line-of-sight RF propagation, but may have blocked, limited or unpredictable functionality when the aircraft is on the ground or at a lower altitude. Additionally air-to-ground systems are very limited in the world.

Embodiments of the invention address the size problems with GEO satellite communications systems on smaller aircraft and the problems with connection speed associated with LEO satellite communications systems by implementing a hybrid LEO/GEO antenna system. In addition, embodiments of the invention allow communications capabilities over the entire globe. Additionally, embodiments include an antenna system configured to continue to provide communications even if a part of the system fails or is otherwise unavailable. Embodiments of the invention are further configured to function when the aircraft is on the ground or in flight.

Embodiments of the invention include a hybrid LEO/GEO antenna system, which is configured to communicate with a LEO satellite constellation and a GEO satellite constellation. The embodied antenna system is small enough to implement on a small- to mid-sized aircraft and provides connection speeds fast enough to enable high speed internet browsing and other communications.

Embodiments of the antenna system take advantage of the difference in size requirements for transmit and receive directional satellite antennas. In some embodiments of the invention, the antenna system includes at least one partial omni-directional antenna communicatively configured for transmitting to and receiving signals from at least one LEO satellite and at least one directional antenna configured for receiving broadband signals from at least one GEO satellite. Directional antennas configured for transmission are typically larger than directional antennas configured for receiving signals in satellite communications systems. The larger size for transmitting directional antennas is due in part to the need to avoid interference with non-target satellites when transmitting to the target satellite. Transmitting directional antenna must be able to provide a narrow enough beam to the target satellite that avoids interference with other satellites; achieving a required narrow beam typically requires a sufficiently scaled larger transmitting directional antenna. Receiving directional antennas, however, do not need to be as large because a directional antenna receiving signals does not cause interference with other satellites and the receive error-correction process is sufficiently robust.

Embodiments of the invention include a hybrid LEO/GEO antenna system, wherein the antenna system includes a smaller directional GEO antenna configured for receiving signals (rather than a larger directional GEO antenna configured for transmitting and receiving) and a partial omni-directional LEO antenna configured for receiving and transmitting. Although partial omni-directional LEO antennas typically provide slower connection speeds than directional GEO antennas, the LEO antenna and network processor may be used for transmitting internet requests. The transmission of internet requests generally involves the transmission of less data than the receipt of the requested internet content, as the internet request may include a small amount of data, such as a uniform resource locator (URL). Whereas, the to-be-received content associated with the URL may include substantially more data such as graphics, text, etc. Therefore, embodiments including a partial omni-directional LEO antenna are suitable for providing transmission of internet requests to an off-board host, while at the same time having a much smaller size than a transmitting directional GEO antenna. The hybrid LEO/GEO system uniquely complements each satcom system in several respects by bringing appropriate bandwidth to the up and down-link and using the smaller transmit antenna to replace the otherwise larger antenna.

Similarly, embodiments of the hybrid LEO/GEO antenna system include a directional GEO antenna configured for receiving the requested internet content, television feed, or other information. Embodiments include the directional GEO antenna configured for receiving, wherein the directional GEO antenna is much smaller than a similarly constructed directional antenna configured for transmitting. As such, embodiments including a directional GEO antenna configured for receiving are suitable for implementation onboard small- to mid-sized aircraft. The use of a receiving directional GEO antenna provides greater receiving connection speed than a partial omni-directional LEO antenna. Typically, internet connection speed is more critical in the download direction (i.e., receiving) for end-users (such as an internet user in an aircraft) because the requested internet content is much larger in data size than the size of transmitted internet requests. Embodiments including the directional GEO antenna are configured to provide the desired connection rate for high speed internet capabilities.

Embodiments of the hybrid LEO/GEO antenna system are configured to provide a system small enough for use onboard a small- to mid-sized aircraft while also providing desired connection speed. Embodiments of the antenna system include implementing a high speed receiving directional GEO antenna, coupled with a two-way partial omni-directional LEO antenna, which can have a significantly smaller size than a two-way directional GEO antenna. Some embodiments take advantage of the different connection speeds required for transmission of internet requests in contrast to the receipt of content associated with the internet requests. In addition, embodiments of the invention are configured for providing communications across the globe. Additionally, the embodied antenna system is configured to provide at least a portion of communications if one element of the system fails or if one type of satellite is otherwise unavailable.

Figure 2A:
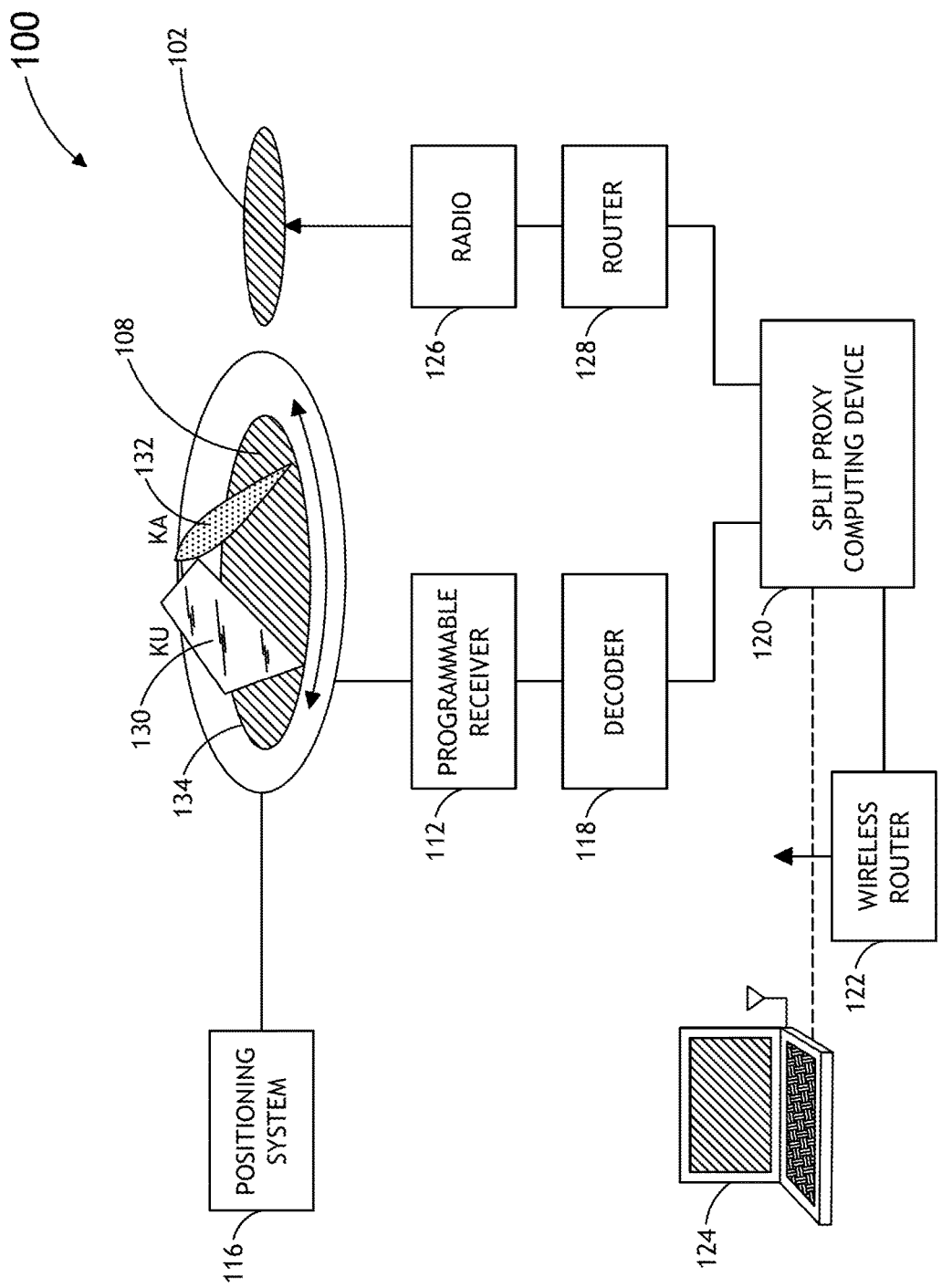
FIG. 2A shows a further diagram of an aircraft satellite communications system.
Figure 2B:
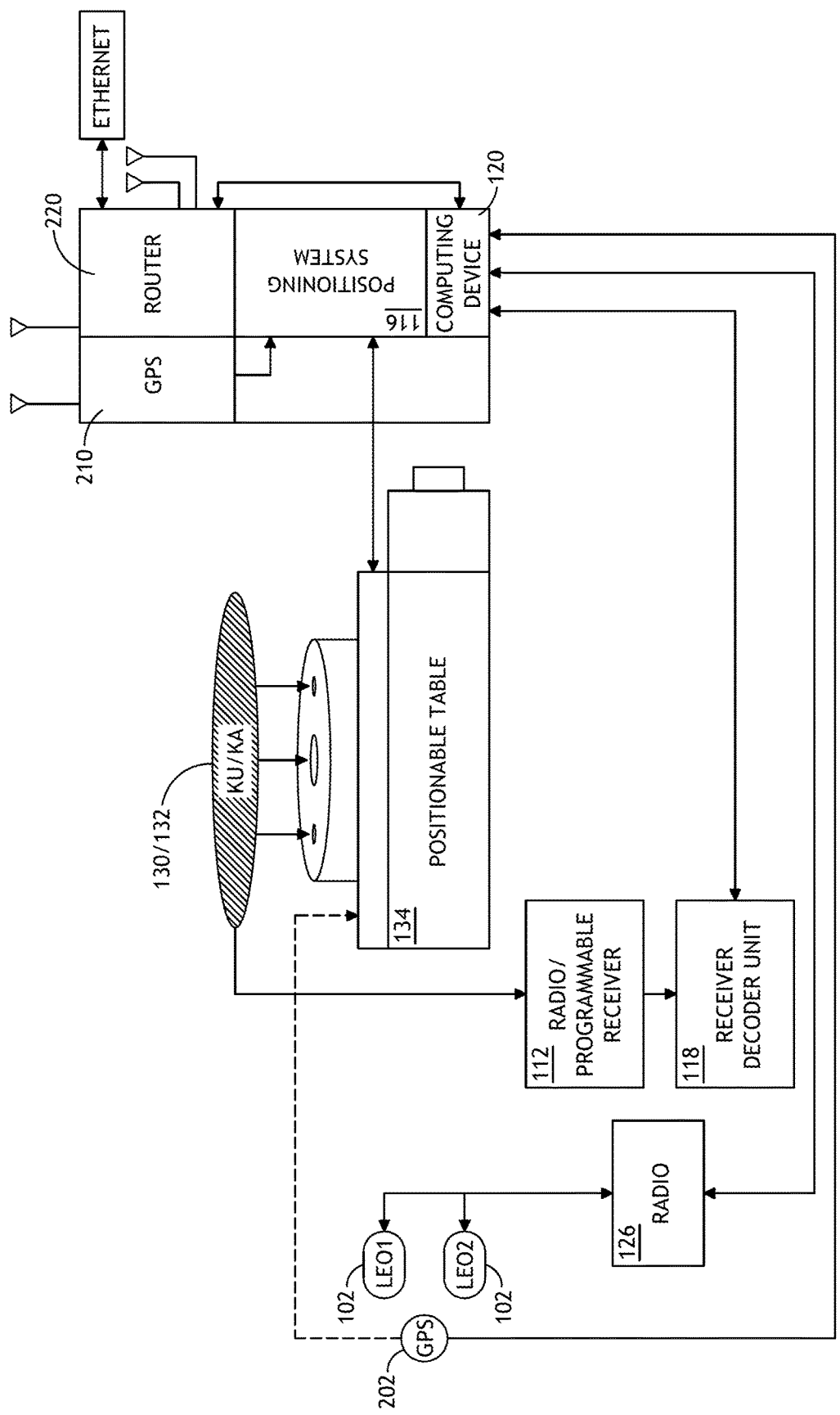
FIG. 2B shows a diagram of an aircraft antenna system and communications system.
Figure 3:
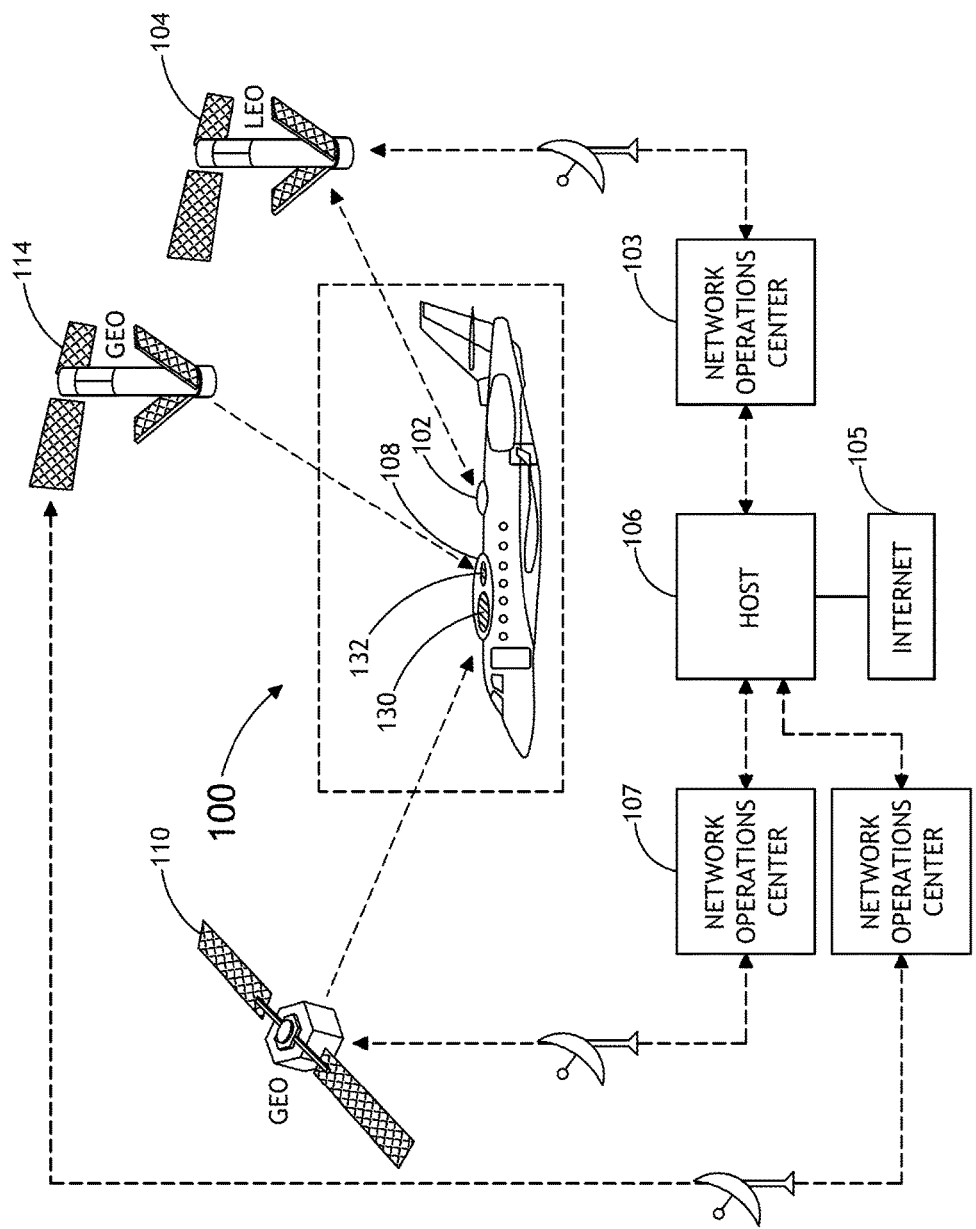
FIG. 3 shows a diagram of an aircraft satellite communications system including a first satellite, second satellite, and third satellite.

Referring now to FIGS. 1-3, an aircraft satellite communications system 100 is depicted. The aircraft satellite communications system 100 may be used to provide a broad range of communications and entertainment services onboard an aircraft, including internet broadcasts, full interactive internet, live television, internet television service, high speed internet service, simultaneous internet and television, IPTV (internet protocol television) IP television streaming, and voice service, among other communications services. The aircraft satellite communications system 100 may implement a hybrid communications approach in order to improve system latency and facilitate the use of small on-board components suitable for use on an aircraft. In addition, the aircraft satellite communications system may be capable of providing communications across the globe. Furthermore, the aircraft satellite communications system 100 may still provide functionality even if part of the system fails or is otherwise unavailable.

Some embodiments of the aircraft satellite communications system 100 include a receiver/transmitter system 102 (such as a partial omni-directional antenna system) configured for transmitting and receiving data from a low earth orbit satellite system 104. The low earth orbit satellite system 104 may be in communication with a host 106. The low earth orbit satellite 104 may be configured for receiving a request from the receiver/transmitter system 102 and communicating the request to the host 106. The aircraft satellite communications system 100 may also include a receiver system 108 (such as a directional antenna system) configured for receiving data from a geostationary orbit satellite 110. The geostationary orbit satellite 110 is also in communication with the host 106 and is configured to receive a response to the request from the host 106 and to transmit the response to the receiver system 108.

In some embodiments, the low earth orbit satellite system 104 shown in FIG. 1 includes a low earth orbit satellite or medium earth orbit satellite. For example, in some embodiments, the low earth orbit satellite system 104 includes an Iridium or an Iridium NEXT satellite. In some embodiments, the low earth orbit satellite system 104 operates in the L band of the electromagnetic spectrum. The low earth orbit satellite system 104 is configured to provide two-way communication with a receiver/transmitter antenna 102 of an aircraft. The low earth orbit satellite 104 may include a particular low earth orbit satellite in one embodiment, or a plurality of low earth orbit satellites in another embodiment.

Geostationary satellites (such as the geostationary orbit satellite 110) stay in approximately a same position above a particular location on the earth (or a particular celestial body), whereas non-geostationary satellites (such as LEO satellites or medium earth orbiting satellites) orbit the earth (or particular celestial body). The geostationary orbit satellite 110 may include any geostationary orbit satellite. In some embodiments, the geostationary orbit satellite 110 includes a satellite that is configured to transmit in the $K_a$ band of the electromagnetic spectrum (frequencies of approximately 20-40 GHz). Additionally, in some embodiments, the geostationary orbit satellite 110 includes a satellite that is configured to transmit in the $K_u$ band of the electromagnetic spectrum (frequencies of approximately 10-18 GHz). The geostationary orbit satellite 110 may include a particular geostationary orbit satellite in one embodiment, or a plurality of geostationary orbit satellites in another embodiment.

In some embodiments, the receiver system 108 (such as a directional antenna or multi-band directional antenna) of the aircraft shown in FIGS. 1-3 is configured to receive one or more bands of frequencies from one or more GEO satellites. For example, in some embodiments, a multi-band directional antenna is configured to receive signals in the $K_a$ band of the electromagnetic spectrum (frequencies of approximately 20-40 GHz), the $K_u$ band of the electromagnetic spectrum (frequencies of approximately 10-18 GHz), or the L band. For example, in some embodiments the receiver system comprises a dual-band directional antenna configured to receive signals simultaneously, approximately simultaneously, or non-concurrently from a plurality of GEO satellites over the $K_a$ and $K_u$ bands.

In some embodiments, the receiver system 108 of the aircraft satellite communications system 100 is configured to receive signals but not transmit. In other embodiments, the receiver system 108 is be configured for both receiving and transmitting communications. The transmission function of the receiver system 108 may be selectively engaged depending on the circumstances. In some embodiments, for example, the receiver's transmission function is turned off, disabled, circumvented, or bypassed when other transmission options are available. If there is a lack of transmission options (for example, if the low earth orbit satellite 104 in communication with the receiver/transmitter system 102 is not available), the transmit option for the receiver system 108 may be engaged.

In some embodiments, the receiver system 108 decodes and the host 106 encodes. For example, encoding or decoding may be implemented by using one or more of the following: transmission redundancy, interleaving, rateless erasure codes (for example Fountain codes), fast erasure codes (for example, Tornado codes), Turbo, Viterbi, Reed Solomon, forward error correction codes, or the like.

In some embodiments, the receiver system 108 comprises at least one directional antenna. In some embodiments, the at least one directional antenna includes at least one electronically scanned array (ESA) panel. In some embodiments, each of the at least one directional antenna is electronically steerable. In some embodiments, the at least one directional antenna is implemented as at least one ESA panel positioned to lay flat against a portion of the aircraft fuselage, producing a conformal ESA system where the receiver system 108 is fixed on the fuselage and the gain pattern of each of the at least one ESA panel is steered electronically by the phased array to accommodate an angle of an incoming satellite beam. In some embodiments, the ESA panel is curved such that the ESA panel conforms to a curvature of the aircraft's body, other vehicle's body, or other structure. In other embodiments, the receiver system 108 includes other antenna types, such as a parabolic antenna, a variable inclined transverse stub antenna, a passive array antenna, a horn array antenna, or other antenna system.

Referring now to FIG. 2A, in some embodiments the receiver system 108 includes two or more electronically scanned array (ESA) panel antennas. In an exemplary embodiment, the receiver system 108 includes a $K_u$ band ESA panel 130 and a $K_a$ band ESA panel 132, each mounted on a turning table 134 (e.g., positionable table). In some embodiments, the $K_u$ band ESA panel 130 and the $K_a$ band ESA panel 132 are tilted against each other as shown in FIG. 2A to facilitate pointing the appropriate panel towards the geostationary orbit satellite 110. In this configuration, the two panels volumetrically reduce or optimize the space where existing three dimensional antenna options can not.

In other embodiments, either or both of the $K_u$ band panel 130 and a $K_a$ band panel 132 are oriented substantially flat against the surface of the aircraft. Similarly, in some embodiments, only one ESA panel is included. In some embodiments, the turning table 134 is configured to adjust an azimuthal orientation of the ESA antenna by rotating the turning table to point the appropriate ESA panel more toward the geostationary orbit satellite 110, while also increasing or improving the look-angle to the horizon reducing cosine roll-off effects generally a characteristic of flat panel arrays. When the receiver system 108 is in communication with a $K_u$ band geostationary orbit satellite, the turning table 134 may rotate to orient the $K_u$ band panel 130 towards the geostationary orbit satellite 110, with the $K_a$ band panel 132 oriented away from the geostationary orbit satellite 110. Similarly, when the system 100 is in communication with a $K_a$ band geostationary orbit satellite, the turning table 134 is configured to rotate to orient the $K_a$ band panel 132 towards the geostationary orbit satellite 110 while the $K_u$ band panel 130 is oriented away from the geostationary orbit satellite 110. In some embodiments, a panel which is not in use at a particular time may be switched off, disengaged, or disabled. In some embodiments, ESA panel antennas, which include a $K_u$ band panel 130 and a $K_a$ band panel 132, provide unique flexibility from a flat panel design, to the aircraft satellite communications system 100 by allowing it to receive communications from either a $K_a$ band or a $K_u$ band geostationary orbit satellite.

In some embodiments, the receiver/transmitter system 102 shown in FIGS. 1-3 includes one or more partial omni-directional antennas, which in some implementations includes one or more conformal patch antennas. In some implementations, the partial omni-directional antenna comprises a omni-directional antenna. Advantageously, embodiments of the antenna system are small enough to be configured to be installed as at least one partial omni-directional antenna and at least one directional ESA panel antenna on nearly any size aircraft (for example, on light jets, super-mid and mid-sized aircraft, or unmanned drone aircraft).

In some embodiments, the low earth orbit satellite 104 and the geostationary orbit satellite 110 may be in communication with a host 106. The host 106 includes a ground-based network operations center capable of providing direct broadcast satellite television programming, internet service, and other data services. The host 106 is configured to communicate with the internet 105, including the World Wide Web as well as other services such as data services, direct broadcast television program, telephone, facsimile, email, weather, ADS-B (Automatic Dependent Surveillance Broadcast) data, ADS-B satcom data, and other services, and the like. In some embodiments, the system 100 is configured to simultaneously, nearly simultaneously, or non-concurrently provide internet, television, voice, and other data services.

Embodiments of the invention include at least one low earth orbit satellite 104 and at least one geostationary orbit satellite 110 being in communication with at least one network operations center. The network operations centers is configured for receiving and transmitting communications with their corresponding satellite network as well as an indicated recipient or host. The network operations centers are configured to direct communication with internet, broadcast, television, communications, or other service providers.

In operation, a particular low earth orbit satellite 104 transmits the request received from the receiver/transmitter system 102 to a first network operations center 103. The first network operations center 103 may be a ground based service provider associated with the low earth orbit satellite 104 satellite network. The first network operations center 103 is configured to receive communications from the low earth orbit satellite 104 and to transmit the communication to the host 106.

In some embodiments, the host 106 and the geostationary orbit satellite 110 are also in communication with a second network operations center 107. The second network operations center 107 may be a ground based service provider associated with the geostationary orbit satellite 110 satellite network. The second network operations center 107 is configured for receiving data from the host 106 and transmitting the communication to the geostationary orbit satellite 110.

The low earth orbit satellite 104 may be configured for receiving a request from the receiver/transmitter system 102 and communicating the request to the host 106. The request may include an internet file request in some embodiments. For example, the request may include a uniform resource locator for a web page.

The request may be indexed in order to reduce the bandwidth required to transmit the request. Indexing of requests may also help to reduce latency in sending requests. Indexing the request may involve replacing an outgoing uniform resource locator string with a unique abbreviated uniform resource locator string or a shortened numerical code. The indexing may be performed by the host 106 or may be performed by a server onboard the aircraft, and then decoded by the host 106.

For example, a 300 character uniform resource locator string may be represented with a 3 character representation or a single numerical code in one embodiment. The indexed request may be computed or determined by the host 106. For example, the host 106 may index all of the uniform resource locators on the requested web page upon receipt of an initial request. The host 106 may then return the indexed pages to the split proxy computing device/link manager 120. For any subsequent request on the same web site, the indexed request may be transmitted instead of the full request. As the host 106 originally determined the indexed pages, the host 106 is able to decode the subsequent indexed requests to the full request.

The indexed request may also be computed or determined by an algorithm implemented by a server onboard the aircraft, such as split proxy/link manager 120 shown in FIG. 2A. In that case, the host 106 may be configured with the same algorithm as the onboard system and is able to decode the indexed request to the original request.

Embodiments include the use of indexing to provide advantages by reducing data traffic congestion with the cross switch of the low earth orbit satellite 104 and also by reducing latency in transmitting requests. In some embodiments, indexing may be required in order to provide a required connection speed to the system 100. In other embodiments, the first satellite may be able to provide sufficient connection speed such that indexing is not required. In those embodiments, the requests may not be indexed, or indexing may be used to improve connection speed. Similarly, the requests can be compressed in another embodiment. The host 106 is then be configured to decompress the request to the original request.

The aircraft satellite communications system 100 shown in FIGS. 1 through 3 includes a receiver system 108 configured for receiving data from a geostationary orbit satellite 110. The geostationary orbit satellite 110 is also in communication with the host 106 and receives a response to the request from the host 106 and transmits the response to the receiver system 108. The response may include the requested internet page when the request is a uniform resource locator.

The request may also include the transmission of data and files in embodiments, such as the transmission of attachments. In some cases, the request includes large amounts of data (for example, one or more oversized files). In some embodiments, when the request includes the transmission of data exceeding a predetermined threshold, the request is held for transmission until a time when traffic on the low earth orbit satellite 104 is lower. Similarly, when the request includes the transmission of data exceeding a predetermined threshold, the request may be routed to an alternate transmission link. The alternate transmission link may include an alternate satellite network, an air to ground link, a different channel on the low earth orbit satellite 104, or a channel including a plurality of bonded channels of the low earth orbit satellite 104 or other satellite network. The alternate transmission link may be in communication with the host 106 in one embodiment, and the request may be routed to the host 106 via the alternate transmission link. In another embodiment, the request may include an attachment or email and may be routed directly to the recipient through the alternate transmission link, rather than passing through the host 106.

In a particular exemplary implementation of the use of an alternate transmission link is shown in FIG. 3, where an alternate satellite network may be used to transmit the request. The request may be transmitted via a third satellite 114, which may be in communication with the host 106 in one embodiment. In another embodiment, the third satellite 114 may not be in communication with the host 106 and may deliver the data transmission to the indicated recipient. The third satellite 114 may include a satellite that is configured for supporting in-flight communications. In another embodiment, the third satellite 114 may include an air to ground link and would include a ground based communications tower. In one embodiment, the third satellite 114 may include a medium rate data service that may be used to accept data transmissions from an aircraft and forward the data or mail to its respective address.

One or more requests may be transmitted continuously, meaning the request is transmitted off the aircraft as soon as it is received. In another embodiment, requests may be delivered via a short burst data service or a packet data mode. For example, requests may be batched and delivered via a packet data mode such as a short burst data service. The use of a packet data mode such as a short burst data service to deliver one or more requests to the low earth orbit satellite may reduce latency as the packet data mode may provide a faster connection speed for a particular time period. Similarly, the use of a packet data mode service for transmission of requests may be more cost effective than continuous service in some cases.

An aircraft in flight may switch from one satellite to another satellite based on the satellite coverage of each satellite, the aircraft position, the traffic on a particular satellite, and the cost and availability of different satellites at a given time. Switching of satellites may be done seamlessly without causing any breaks in coverage.

The receiver/transmitter system 102 includes a plurality of receiver/transmitters in some embodiments. In some implementations, the receiver/transmitter system includes a plurality of partial omni-directional antennas. For example, a first receiver/transmitter may be used for the transmission of short burst data requests and a second receiver/transmitter may be used to transmit air to ground requests. In one embodiment, an air to ground radio may be used to augment the large file transfer for delivery to long term evolution cellular systems while the aircraft is on the ground, or even when the aircraft is airborne. The use of an air to ground system may provide reduced satellite communications costs. Exemplary air to ground systems may include systems manufactured by Aircell or Qualcomm in one embodiment, although any suitable air to ground communication system may be used.

In one embodiment, the aircraft satellite communications system 100 may be configured to implement a pre-fetch or forward cache process. Specifically, the host 106 may be configured to respond to a request from the receiver/transmitter system 102 with at least one additional page in addition to the requested page. The additional page may include the web page corresponding to a uniform resource locator on the same web site as the originally requested web page. For example, if the request includes a request for a specific web page, the host may be configured to provide at least one additional web page associated with the requested web site. The host may also be configured to provide all the embedded web page data behind several additional uniform resource locators for the requested page. This information may be transmitted to the geostationary orbit satellite 110 and the receiver system 108 and then stored in a cache. The cache may include the cache on the user's device, or a cache in an onboard server such as the split proxy/link manager 120.

The use of the forward cache process may help to provide faster internet browsing. For example, when a user clicks on another uniform resource locator on the same web site as the originally requested web page, the web page for the selected uniform resource locator is already in the cache and it is not necessary to transmit the new request and wait for a response through the host 106. The use of this forward cache process may have the advantage of reducing latency in the aircraft satellite communications system 100 and providing faster internet browsing.

The proactive delivery of additional pages in the forward cache process may require additional bandwidth. The geostationary orbit satellite 110 and the receiver system 108 are configured to provide the required bandwidth to implement the forward cache process in one embodiment.

Referring to FIG. 2A, embodiments may include additional components. For example, the receiver/transmitter system 102 may include a radio 126 and a router 128, both in communication with the receiver/transmitter system 102. Similarly, the aircraft satellite communications system 100 may also include a computing device, such as a network processor, server, or split proxy/link manager 120 in communication with the radio 126 and the router 128 of the receiver/transmitter system 102. The split proxy/link manager 120 may receive the request through wireless router 122 from a user computer 124, and communicate the request to the receiver/transmitter system 102. The split proxy/link manager 120 may also index the request before communicating it to the receiver/transmitter system 102.

The receiver system 108 may include a programmable receiver 112. The programmable receiver 112 may be configured for receiving the response to the request from the host 106 (via the geostationary orbit satellite 110) and demodulating and error correcting the response. The programmable receiver 112 may also be programmed for a specific satellite or a transponder or transponder channel or logical channel. Similarly, the receiver system 108 may also include a decoder 118 in communication with the programmable receiver 112. The decoder 118 is configured for receiving demodulated signals from the programmable receiver 112 and processing them before delivering the processed data to a user computer 124. The aircraft satellite communications system 100 may also include a positioning system 116.

The user computer 124 may include a laptop computer or other device, such as a personal computer, phone, tablet, or any other device configured for accepting web data and displaying the data as text or graphics. In addition, a plurality of user computers 124 or other devices may be located on the same aircraft and may receive services from the aircraft satellite communications system 100 simultaneously. In addition, the user computer 124 may also include an onboard entertainment system or communication system for the aircraft.

Referring now to FIG. 2B, a further exemplary diagram of embodiments of an aircraft communications system and antenna system is depicted. As shown in FIG. 2B, an embodied antenna system can include at least one directional antenna (such as a Ku band directional antenna 130 and/or a Ka band directional antenna 132) and at least one partial omni-directional antenna (such as two LEO partial omni-directional antennas 102), wherein the at least one antenna and the at least one directional antenna are configured to be communicatively coupled on-board the aircraft via a computing device (e.g., a computing device located in the aircraft, on the aircraft, or in, on, or of any component or system of the aircraft). As exemplarily shown in FIG. 2B, at least one directional antenna 130,132 are communicatively coupled to the computing device 120 through the radio/programmable receiver 112 and the receiver decoder unit 118. Also, the two partial omni-directional antennas 102 are communicatively coupled to the computing device 120 through the radio 126. Furthermore, the computing device 120 can be communicatively coupled to an on-board wired or wireless router 220. The router 220 can be configured transmit and receive data to and from end-user devices 124 on-board the aircraft.

Additionally, a GPS antenna 202 (which can be implemented as a further partial omni-directional LEO antenna) can be communicatively coupled to the computing device 120. In some embodiments, the GPS antenna 202 is in addition to and located separately from a standard aircraft GPS system 210. For example, the standard aircraft GPS system 210 can be located near the front of the aircraft and provide typical aircraft positioning information to cockpit avionics, whereas the GPS antenna 202 can be located separately with embodiments of the antenna system. Implementations of the embodied antenna system having the GPS antenna 202 can reduce or eliminate wiring requirements from the standard aircraft GPS system 210 to the positionable table 134, other control hardware (such as control hardware 1630 of FIG. 16), or the like.

In some embodiments, the computing device 120 may be implemented as a network processor on-board the aircraft or vehicle. In embodiments which the computing device is implemented as a network processor, the network processor may be configured for accelerating transmissions and text through any contemplated satellite systems. The network processor may be configured for sending and receiving data from the radios and two-way IP data traffic from a client, clients, or other machines or processors on-board. The network processor may be configured to buffer and format 2-way data to clients or accept television broadcasts from particular satellite transponders of the K, or $K_a$ geostationary satellites. Additional background regarding implementations of the computing device 120 as a network processor may be found in U.S. Pat. No. 7,761,793, titled "SATCOM Data Compression System and Method", which is hereby incorporated by reference, and in U.S. Pat. No. 7,023,365, titled "System and Method for Compression of Words and Phrases in Text Based On Language Features", which is hereby incorporated by reference.

Still referring to FIG. 2B, some embodiments include the positionable table 134. The at least one directional antenna 130,132 can be attached to the positionable table 134. The positionable table 134 may be configured to rotate an antenna at a fixed angled position such that an azimuthal orientation of the at least one directional antenna 130,132 becomes more aligned with one or more incoming GEO satellite beams. The antenna panel tilt angle from the azimuth table may be prescribed (fixed) according to the required look-angle to the horizon in order to overcome cosine roll-off effects generally an artifact of flat panel array antennas. In some implementations, the positionable table 134 further may include a variable tilt mechanism configured to adjust a vertical tilt orientation of the at least one directional antenna 130,132 such that a vertical orientation of the at least one directional antenna 130,132 becomes more aligned with one or more incoming GEO satellite beams. The positionable table 134 can be configured to change a position of the at least one directional antenna 130,132 based upon information received from the positioning system 116 or a GPS antenna of the antenna system.

In further embodiments, the computing device 120 can be implemented as being part of the receiver system 108 (such as being implemented as a network processor on a circuit board of the receiver system 108). In still further embodiments, the computing device 120 can be implemented on the receiver/transmitter system 102.

A summary of an example operation of the aircraft satellite communications system 100 is now provided. A client device, such as user computer 124, browses the internet and makes a uniform resource locator request to the aircraft split proxy/link manager 120 via, for example, wireless router 122. The request is conveyed through a router 128 to the radio 126 and communicated through the LEO antenna as part of the fuselage-mounted LEO/GEO antenna system to a low earth orbit satellite 104 via receiver/transmitter system 102. The request may include an indexed request. The low earth orbit satellite 104 beams the request (or indexed request, as the case may be) to the host 106. Host 106 receives and processes the request. The host 106 forwards the uniform resource locator request to the internet 105 and the selected web page is returned via the internet 105 to the host 106. In addition, the host 106 may also receive at least one additional web page associated with the selected web page. The host 106 then conveys the response to a geostationary orbit satellite 110. The response may include the requested uniform resource locator only, or the response may include at least one additional web page, or all web pages associated with the requested web page. The host 106 may also index the requested internet page as well as additional pages associated with the requested internet page and return the indexed uniform resource locators with the response. The geostationary orbit satellite 110 beams the response to the GEO antenna as part of the LEO/GEO fuselage antenna system and to the receiver system 108. The response is then demodulated and error corrected by the programmable receiver 112 and sent to the decoder 118, which delivers the response to a user computer 124. If web pages associated with the selected web page are also included with the response, the additional pages may be stored in a cache on the user computer 124 or on the split proxy/link manager 120.

In one embodiment, a communications system may be configured to provide services to a plurality of aircraft simultaneously. Each aircraft in the plurality of aircraft would include a receiver and receiver/transmitter onboard. In addition, the aircraft satellite communications system 100 may be used to provide a broad range of communications simultaneously, including for example, high speed internet and television service simultaneously. Additional background regarding the provision of on board communication systems for an aircraft, including simultaneous television and internet service, may be found in U.S. Pat. No. 6,529,706 titled "Aircraft Satellite Communications System for Distributing Internet Service from Direct Broadcast Satellites", which is hereby incorporated by reference.

An aircraft in flight may switch from one satellite to another satellite based on the satellite coverage of each satellite, the aircraft position, the traffic on a particular satellite, and the cost and availability of different satellites at a given time. The aircraft satellite communications system 100 may be configured to provide communications across a wide geographic range where full GEO satellite connectivity may not be available. Similarly, the communications system may be configured to provide communications if there is a failure in one of the satellite systems. For example, if the aircraft moves out of range of the geostationary orbit satellite 110 (or if the geostationary orbit satellite 110 fails or is otherwise unavailable or less desirable for use at a particular time), the communications system may be configured to use transmitter/receiver 102 as a backup to both transmit and receive communications from low earth orbit satellite 104, rather than using the hybrid communications approach over the low earth orbit satellite 104 and the geostationary orbit satellite 110. Whether to use the hybrid approach over both the low earth orbit satellite 104 and the geostationary orbit satellite 110 or to switch to the low earth orbit satellite 104 only for transmitting and receiving communications will depend on the circumstances, including the current location of the aircraft, the availability of the geostationary orbit satellite 110 network, cost, bandwidth, and the current connection speeds required at a particular time.

The aircraft satellite communications system 100 may also be configured to provide a hybrid GEO satellite and air to ground based approach. For example, the aircraft satellite communications system 100 may be configured to transmit a request to a communications tower located on the ground, instead of transmitting the request to the low earth orbit satellite. Similarly, the aircraft satellite communications system 100 may be configured to transmit requests to either the low earth orbit satellite or to the ground based communications tower. The communications tower may be in communication with an additional network operations center, as well as the host 106. The air to ground based approach may be implemented on an Aircell link, a Qualcomm link, a $K_u$ band link, the Radar Altimeter Band (approximately 4.2-4.4 GHz), cellular bands including 700 MHz LTE, GSM, WiMax bands, or an augmentation to the UAS ADS-B data service or any other suitable communications network.

The receiver/transmitter system 102 may be used for transmission only, or may be used for both transmitting and receiving. The receive function of receiver/transmitter system 102 may be selectively engaged depending on the circumstances. For example, receiver/transmitter system 102 may be used for receiving indexing information from the host 106, as well as for receiving aircraft information such as weather maps, flight bag information, Notice to Airmen (NOTAM) information, etc., or part of the UAS (unmanned aircraft system) ADS-B, Satcom ADS-B or any other data or services, including responses to internet requests from the host 106, voice communications, or the like.

The aircraft satellite communications system of the present disclosure may be suitable for implementation onboard an aircraft. In particular, the aircraft satellite communications system of the present disclosure may be suitable for small to mid-sized aircraft, such as a Learjet, a Cessna Citation, a Gulfstream 150, a Gulfstream 250, a Hawker Beechcraft, as a few examples.

Embodiments of the invention are also directed to a method for providing communications to an aircraft. The method may be implemented by a ground based host in one embodiment, where the host is in communication with a transmitter/receiver system on the aircraft via a low earth orbit satellite. The method may include the step of receiving a request from a low earth orbit satellite, the request including a requested internet page. The method may also include the step of retrieving the requested internet page. A further step of the method may include transmitting the requested internet page to a geostationary orbit satellite, the geostationary orbit satellite configured to transmit the requested internet page to a receiver system on the aircraft.

The request may be provided to the low earth orbit satellite from a receiver/transmitter system on board the aircraft. The request may include an indexed request. The indexed request may include an indexed uniform resource locator for the requested internet page. When the request is indexed, a further step of the method may include decoding the indexed request to obtain a complete uniform resource locator for the requested internet page.

The method may also include an additional step of retrieving at least one additional internet page, the additional internet page associated with the requested internet page. A further step of the method may include transmitting the at least one additional internet page to the geostationary orbit satellite.

Embodiments of the aircraft satellite communications system 100 are configured to provide a broad range of communications and entertainment onboard an aircraft, including internet, broadcast internet, full interactive internet, live television, internet television service and streaming, high speed internet service, and voice service, among other communications services. In addition, the aircraft satellite communications system 100 may be capable of providing internet based or broadcast based television in high definition and 3D, including internet and broadcast television meeting Standard Definition Television standards, High Definition Television standards, Ultra High Definition Television standards, and Three Dimensional TV standards.

It is believed that the aircraft satellite communications system of the present disclosure may provide several advantages. For example, the aircraft satellite communications system may enable the use of smaller two way television and internet antenna solutions for smaller aircraft such as business jets. Similarly, the aircraft satellite communications system of the present disclosure may enable a greater range of satellite provider options. For example, the use of a down link only satellite as the second satellite may reduce leasing costs and also provide a greater number of satellite options. In addition, the aircraft satellite communications system of the present disclosure may provide near seamless coverage when traveling in and out of $K_a$ or $K_u$ band spot beams using one or more satellite providers. In addition, the aircraft satellite communications system of the present disclosure may take advantage of existing servers and satellite infrastructure and programming. The aircraft satellite communications system of the present disclosure may also be capable of providing communications across the globe.

In some embodiments, the GEO satellites ($K_u$ or $K_a$) 110 can use a spot-beam technology. The spot-beam technology includes a mosaic of smaller individual "spot beams" which slightly overlap to cover an entire region (such as a continent or ocean) as opposed to one large beam used to cover a region. A particular smaller spot-beam behaves much like a large main beam; however, when an aircraft or vehicle traverses from one small spot beam (from one particular GEO satellite) into the next small spot-beam (of a next particular GEO satellite), the position of the aircraft may need to be reported back to the NOC 107 associated with the next particular GEO satellite 110 so that the return data response is directed through the correct physical spot-beam or RF channel. As such, some embodiments of the antenna system include an off-board link or LEO antenna (e.g., a partial omni-directional antenna 102) configured to report the aircraft position to the NOCs 107 associated with particular GEO satellites 110. In some embodiments, the off-board link or the LEO antenna (e.g., a partial omni-directional antenna 102) is configured to report the aircraft position as part of data requests, in a scheduled manner to the host 106 on the ground, or the like.

Referring now to FIGS. 4-6B, an exemplary communication system 400 of some embodiments of the invention is depicted.

Figure 4:
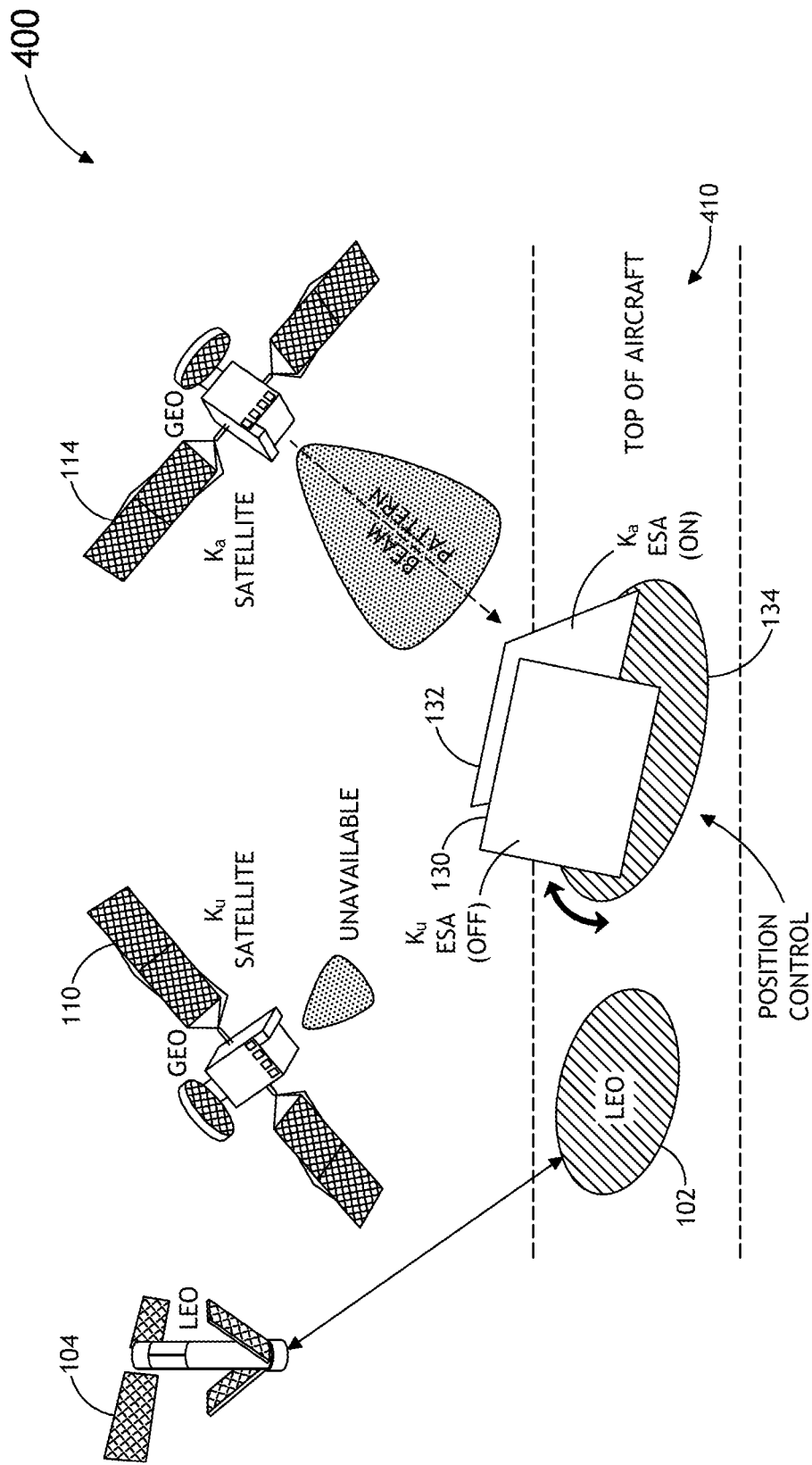
FIGS. 4-5 show an exemplarily embodied antenna configured to switch use of directional antennas.
Figure 5:
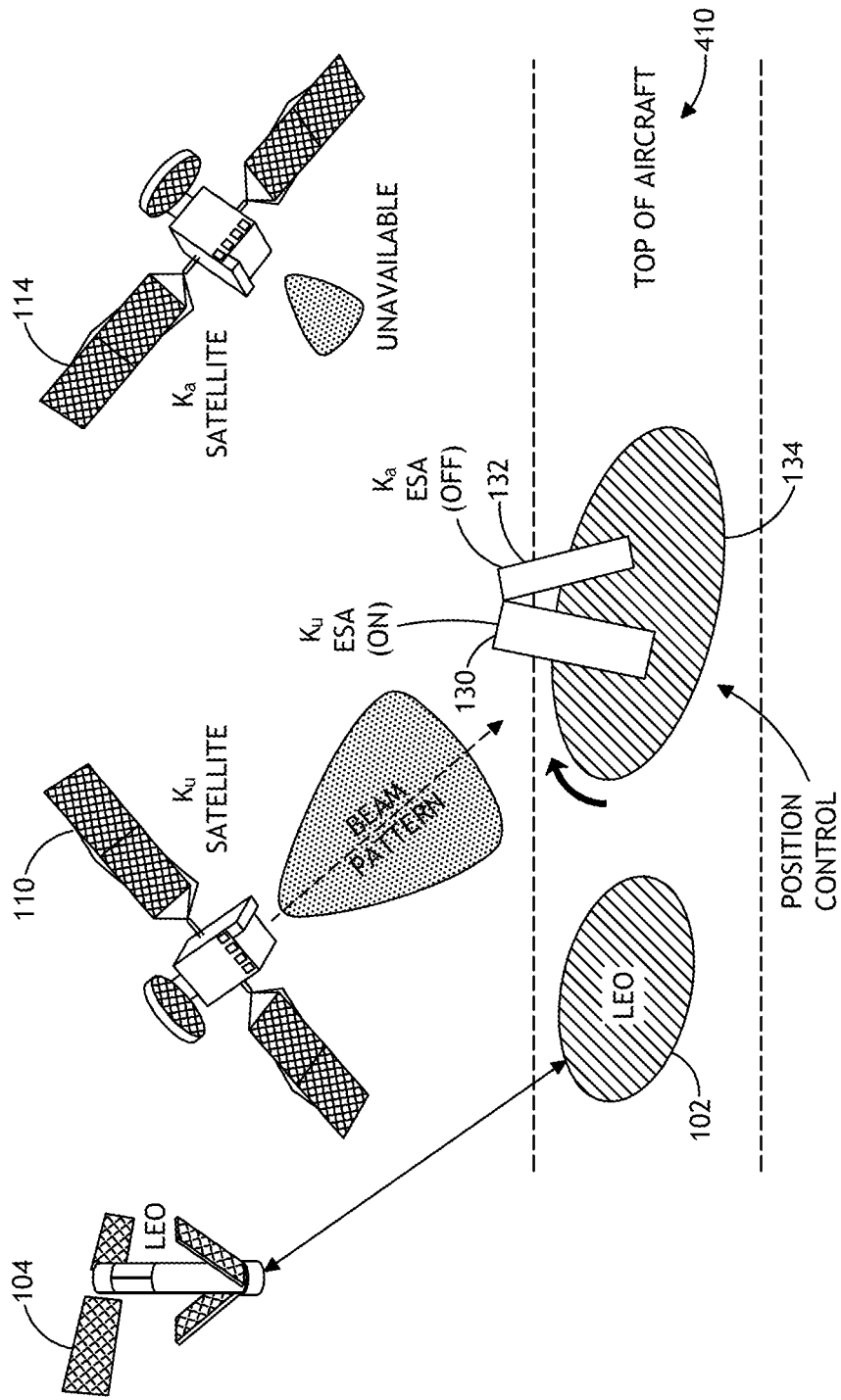

As shown in FIGS. 4-5, an antenna system includes at least one LEO antenna 102 and at least two GEO directional antennas 130, 132. In some embodiments, the antenna system is configured to be installed on top of an aircraft 410 (or on any other portion of the aircraft 410). The at least two GEO directional antennas 130, 132 of the antenna system are configured to receive signals from one or both of at least two GEO satellites 110, 114 over different bands (such as portions of a Ku band, Ka band, L band, or similar bands) and/or over different polarization orientations of a same or different band (such as left-hand, right-hand, vertical, or horizontal polarizations). In some embodiments, one or more of the at least two GEO directional antennas is implemented as an ESA panel antenna, a VICS antenna, a parabolic antenna, or any other suitable directional antenna. In some embodiments, the at least two GEO directional antennas 130, 132 are implemented as a multi-band directional antenna (such as a single ESA panel configured to receive at least two bands or at least two polarization orientations). For example, as depicted in FIGS. 4-5, directional GEO antenna 130 is configured to receive signals from GEO satellites (such as satellite 110) over the Ku band, and directional GEO antenna 132 is configured to receive signals from GEO satellites (such as satellite 114) over the Ka band.

In some embodiments, one or more of the at least two GEO directional antennas 130, 132 can be attached to a positionable table 134. The positionable table 134 is configured to rotate the orientation of the at least two directional GEO antenna to have a more direct line of sight with a desired GEO satellite. In some embodiments, the antenna system is configured to position a particular directional GEO antenna toward an available or desired satellite by rotating the positionable table 134. Additionally, in some embodiments the antenna system is configured to switch between desired or available satellites automatically. In some embodiments, the antenna system is configured to disable or enable particular directional antennas. For example, in FIG. 4 the antenna system is configured to enable Ka ESA antenna 132 when a beam from the Ka satellite 114 is available and to disable Ku ESA antenna 130 when a beam from the Ku satellite 110 is unavailable. Similarly, as shown in FIG. 5 the antenna system is configure to enable Ku ESA antenna 130 when a beam from the Ku satellite 110 is available and to disable Ka ESA antenna 132 when a beam from the Ka satellite 132 is unavailable.

Still referring to FIGS. 4-5, the at least one LEO antenna 102 of the antenna system is configured to send signals to and receive signals from one or more LEO satellites (such as satellite 104). In some embodiments, the at least one LEO antenna 102 comprises at least one partial omni-directional antenna.

The embodiments depicted in FIGS. 4-5 are merely exemplary and should not be construed as limiting the scope of the invention to the particular examples shown; for example, in some embodiments, the antenna system can include a multi-band GEO directional antenna rather than (or in addition to) two or more GEO directional antennas, wherein the multi-band directional antenna is a single GEO directional antenna configured for receiving two or more bands of signals from two or more GEO satellites (simultaneously, approximately simultaneously, or non-concurrently).

Figure 6A:
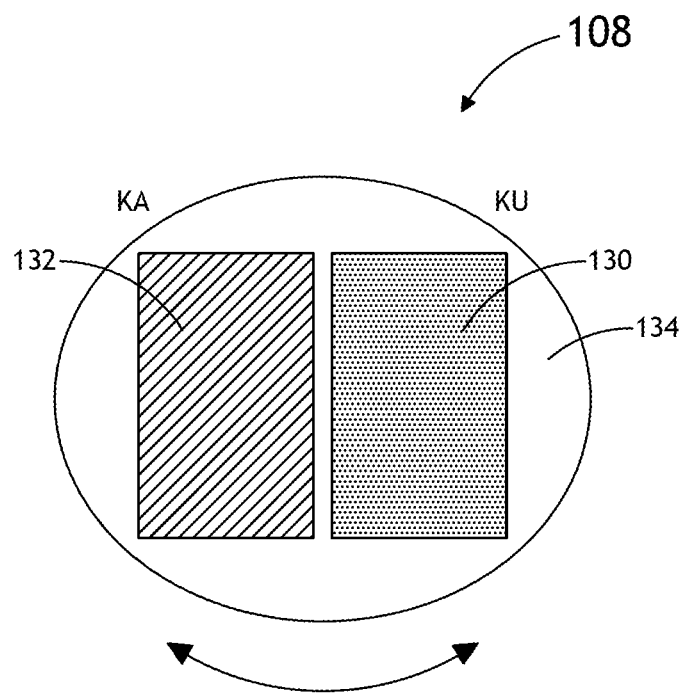
FIG. 6A shows an exemplary top view of embodiments which include at least two directional antennas.
Figure 6B:
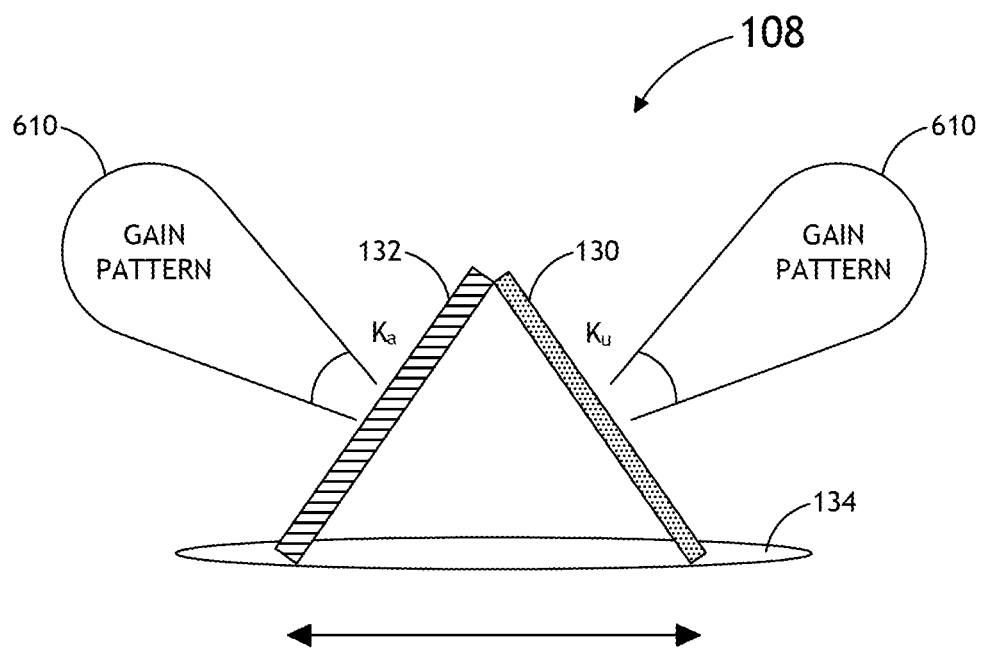
FIG. 6B shows an exemplary side view of embodiments which include at least two directional antennas.

Referring now to FIGS. 6A and 6B, two implementations of a receiver system 108 of the exemplary antenna system (shown in FIGS. 4-5) are depicted.

FIG. 6A depicts an exemplary overhead view of some embodiments of the invention which include at least two directional GEO antennas implemented as ESA panel antennas 130, 132 attached flatly to a positionable table 134.

Referring to FIG. 6B, in one embodiment, the at least two directional GEO antennas, which are implemented as ESA panel antennas 130, 132, are attached to the positionable table 134 such that the back of each ESA panel is tilted back toward a top portion of another panel. For example, ESA panel antenna 130 and ESA panel antenna 132 can be configured such that a plane extending from a surface of ESA panel antenna 130 intersects a plane extending from a surface of the ESA panel antenna 132. The tilted panel configuration in FIG. 6B allows gain patterns 610 of ESA panels to be more directly aligned with beam patterns of satellites. Gain patterns of ESA panel antennas refer to the zone of incoming electromagnetic beam angles which the ESA panel antenna can operatively receive. Beam patterns refer to a zone corresponding to a tightness of transmitted beam width.

Additionally, in some embodiments, a partial omni-directional antenna 102 can be part of or attached to the tilted ESA panel antennas 130, 132 (of FIG. 6B) or part of the antenna's supporting pedestal. For example, a partial omni-directional antenna 102 can be installed above ESA panel antennas (such as ESA panel antenna 130 and ESA panel antenna 132) which are tilted back toward each other (as shown in FIG. 6B). Installation of a partial omni-directional antenna 102 at a high point of the antenna or antenna's pedestal, such as above two ESA panel antennas tilted back toward each other, provides the partial omni-directional antenna 102 with an improved line of sight with LEO satellites; additionally, installation of a partial omni-directional antenna 102 above two ESA panel antennas tilted back toward each other does not block a line of sight or gain patterns 610 of the two ESA panel antennas 130, 132.

Figure 7:
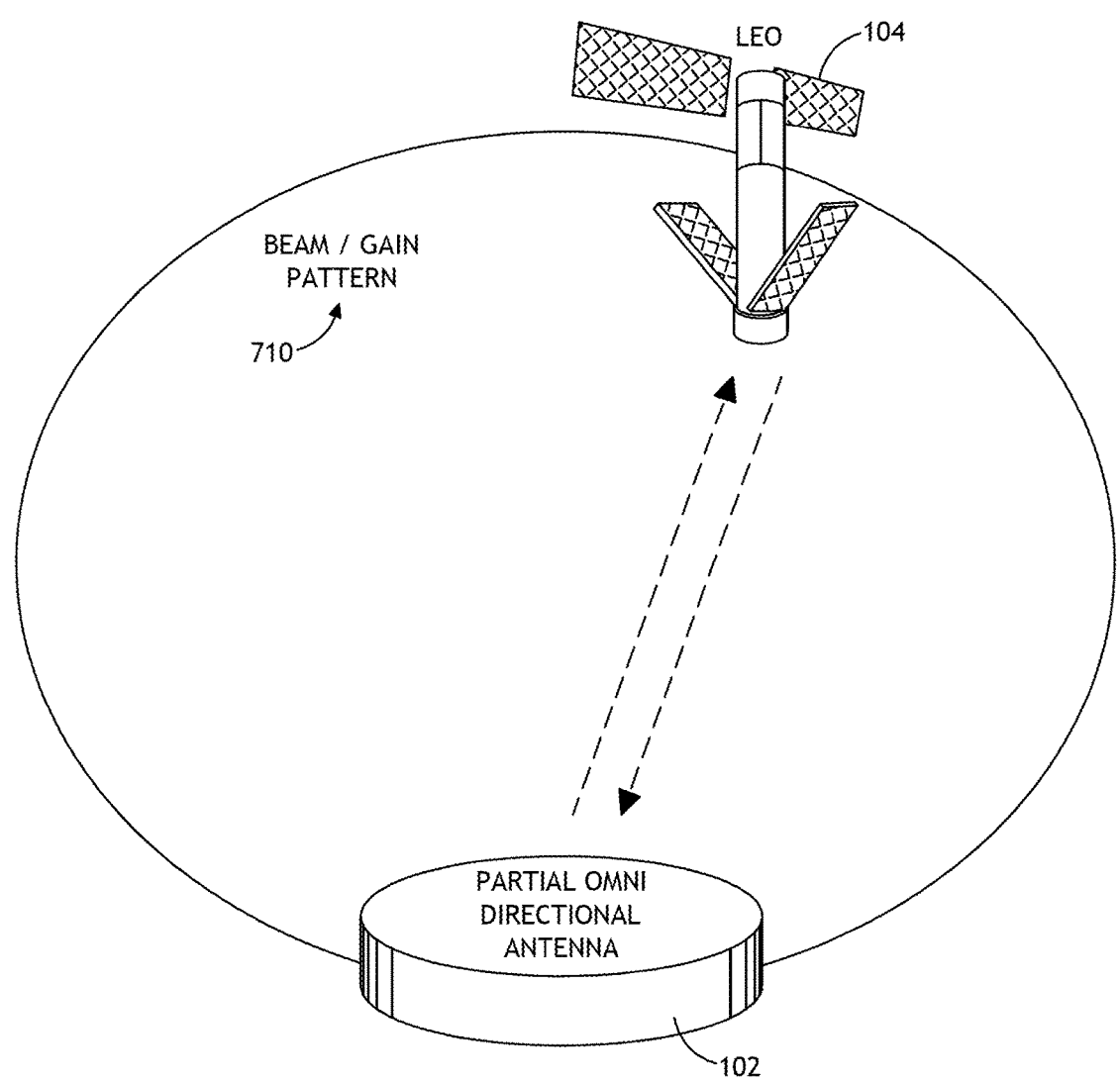
FIG. 7 shows an exemplary overlapping portion of a beam and gain pattern of a partial omni-directional antenna.

Referring now to FIG. 7, an exemplary overlapping portion of a beam and gain pattern 710 of a partial omni-directional antenna 102 and a LEO satellite 104 of an embodiment of the invention is depicted. A partial omni-directional antenna 102 is configured to receive signals from a wide angle of sources at the same time, and as such, a partial omni-directional antenna 102 has a much wider gain pattern than a directional antenna (such as an ESA panel antenna). Likewise, the partial omni-directional antenna 102 is configured to transmit signals with a beam width approximately as extensive as the partial omni-directional antenna's gain pattern; that is, the transmit beam pattern of the partial omni-directional antenna can be as extensive as its gain pattern. For example, in some embodiments a partial omni-directional antenna is configured to receive signals originating from substantially any direction and transmit signals in substantially every direction at a particular time. (For example, some partial omni-directional antennas may configured to receive signals originating from any direction except that they may not be capable of receiving signals originating from within an internal element of the antenna itself or except that they may not be capable of receiving signals originating from a direction corresponding to (e.g., blocked by) an attachment point of the partial omni-directional antenna to an aircraft.) In an exemplary embodiment, the partial omni-directional antenna 102 is configured to receive signals originating from at least anywhere in a horizon-to-vertical-to-horizon (e.g., a range of 0-360 degrees azimuth with a minimum beamwidth range of 8-90 degrees for existing LEO satellites and preferably 0-90 degrees vertical) in order to effectively accommodate the entire LEO constellation including any aircraft roll or pitch. In some exemplary embodiments, the partial omni-directional antenna is configured to transmit or receive signals at or below its mechanical horizontal reference and across the fully range of the sky.

Referring now to FIGS. 8A-12C, exemplary implementations of embodiments of the antenna system are depicted.

Figure 8A:
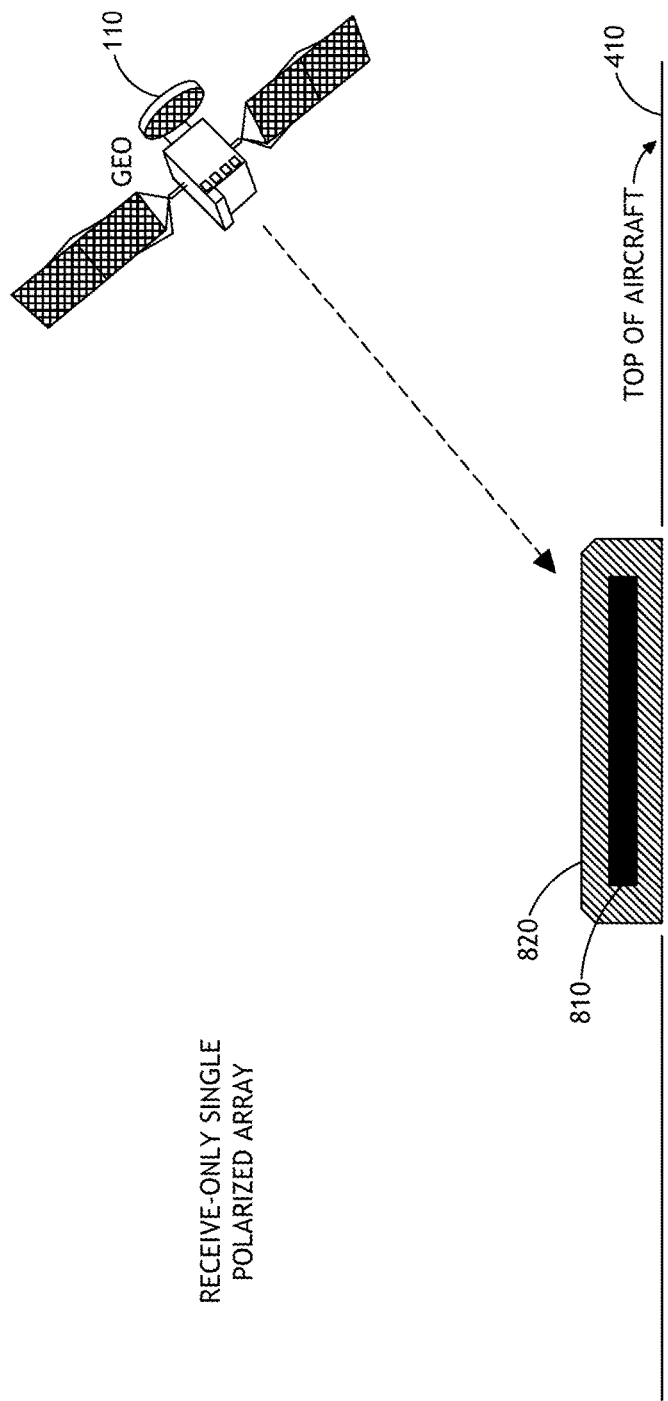
FIGS. 8A-C show exemplary views of embodiments which include a receive-only directional antenna.

FIG. 8A depicts a configuration of an exemplary GEO directional antenna 810 of a receiver system of some embodiments. The exemplary GEO directional antenna 810 is configured only for receiving signals and not for transmitting signals to satellites. The exemplary GEO directional antenna 810 is configured to receive one or more bands of signals of a single polarization orientation at a particular time from GEO satellites (such as GEO satellite 110). The exemplary GEO directional antenna 810 is implemented as an ESA panel antenna mounted to the top of an aircraft 410. A radome 820 covers the exemplary GEO directional antenna 810.

Figure 8B:
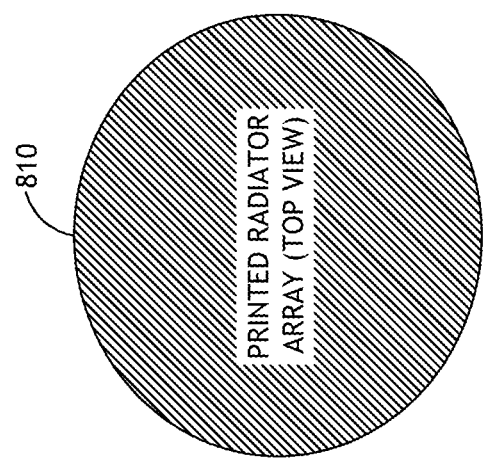
Figure 8C:
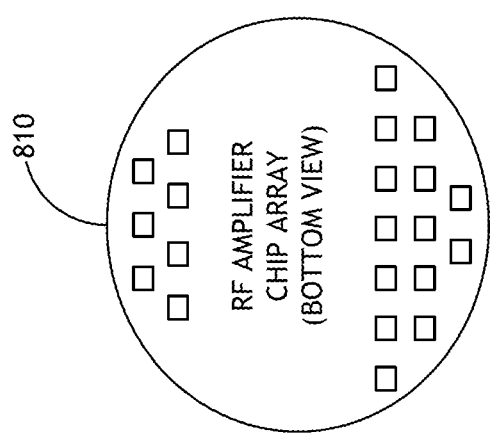

FIGS. 8B and 8C depict top and bottom views of the exemplary GEO directional antenna 810 implemented as an ESA panel antenna (of FIG. 8A). In embodiments of the invention, an ESA panel antenna may be at least partially constructed of printed circuit board materials, dielectric materials, laminate materials, and/or bonding materials. Referring to FIG. 8B, the top view depicts a printed radiator array of the exemplary GEO directional antenna 810 implemented as an ESA panel antenna. Referring to FIG. 8C, the bottom view depicts a radio frequency chip array of the exemplary GEO directional antenna 810 implemented as an ESA panel antenna.

Figure 9:
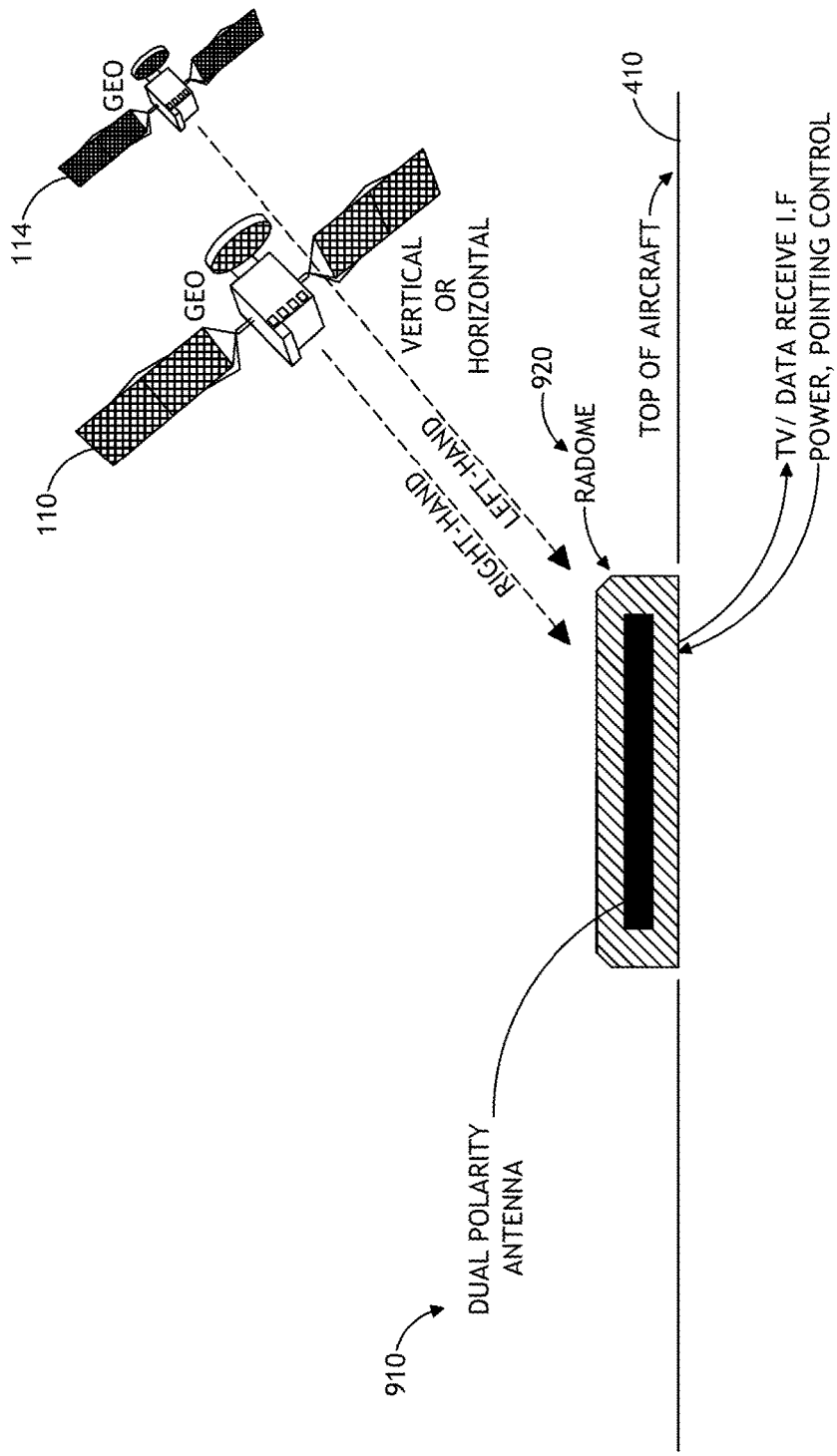
FIG. 9 shows an exemplary view of embodiments which include a dual-polarity directional antenna.

Referring to FIG. 9, a configuration of an exemplary dual-polarity GEO directional antenna 910 of a receiver system of some embodiments of the antenna system is depicted. The exemplary dual-polarity GEO directional antenna 910 is configured only for receiving signals and not for transmitting signals to satellites. The exemplary dual-polarity GEO directional antenna 910 is configured to receive two beams of signals over one portion of a band (e.g., Ka or Ku) for two polarization orientations (e.g., left-hand and right-hand polarization or vertical and horizontal polarization) at a particular time from two GEO satellites (such as GEO satellites 110, 114). The exemplary dual-polarity GEO directional antenna 910 is implemented as an ESA panel antenna mounted to the top of an aircraft 410. The exemplary dual-polarity GEO directional antenna 910 is communicatively coupled to at least one computing device (such as a split-proxy computing device 120) on-board the aircraft 410. Upon receiving signals from either or both of the GEO satellites 110, 114, the exemplary dual-polarity GEO directional antenna 910 is configured to communicate received data as intermediate frequency signals to a programmable receiver 112 and/or decoder 116 on-board the aircraft 410. A radome 920 covers the exemplary dual-polarity GEO directional antenna 910.

In embodiments of the invention, an ESA panel antenna, such as the exemplary dual-polarity GEO directional antenna 910, may be at least partially constructed of printed circuit board materials, dielectric materials, laminate materials, and/or bonding materials. In a first implementation, the exemplary dual-polarity GEO directional antenna 910 can include a dual array of antenna elements, wherein a first portion of the antenna elements are configured for receiving a first polarization orientation and a second portion of the antenna elements are configured for receiving a second polarization orientation. In additional implementations, individual antenna elements of ESA panel antennas may include multiple stripline feed layers configured to receive multiple signals of two or more polarizations simultaneously; for example, each antenna cell of the exemplary dual-polarity GEO directional antenna 910 can include two stripline feed layers, wherein each antenna element a first stripline feed layer is configured to receive signals of a first polarization orientation (e.g., left-hand or vertical polarization) and a second stripline feed layer is configured to receive signals of a second polarization orientation (e.g., right-hand or horizontal polarization). Additionally, pairs of amplifier elements as part of a dual-polarized array may be individually phased and amplitude controlled to collectively produce separate selected polarizations.

Figure 10:
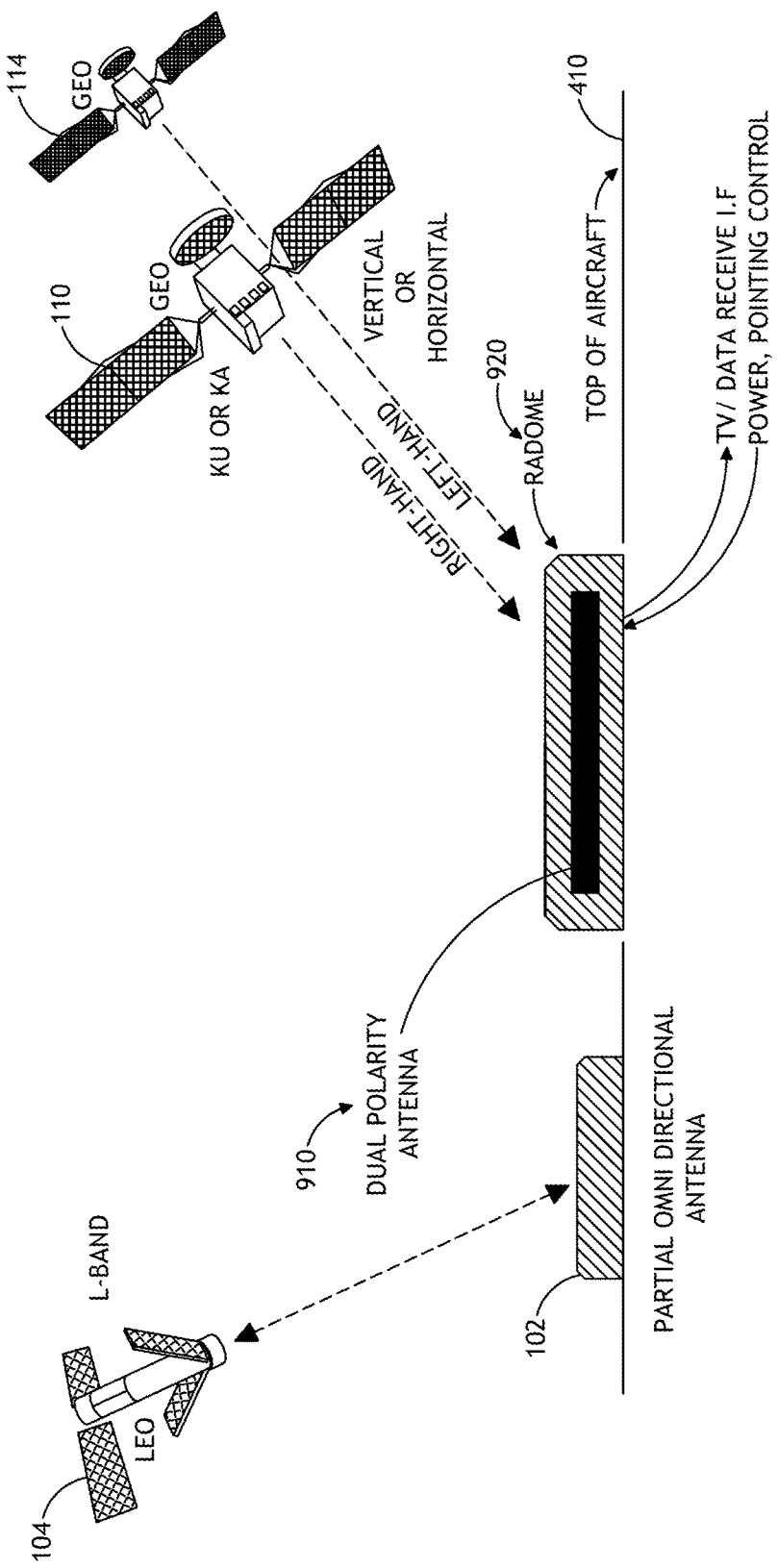
FIGS. 10-11 show exemplary configurations of embodiments of the antenna system which include at least one dual-polarity directional antenna and at least one partial omni-directional antenna.
Figure 11:
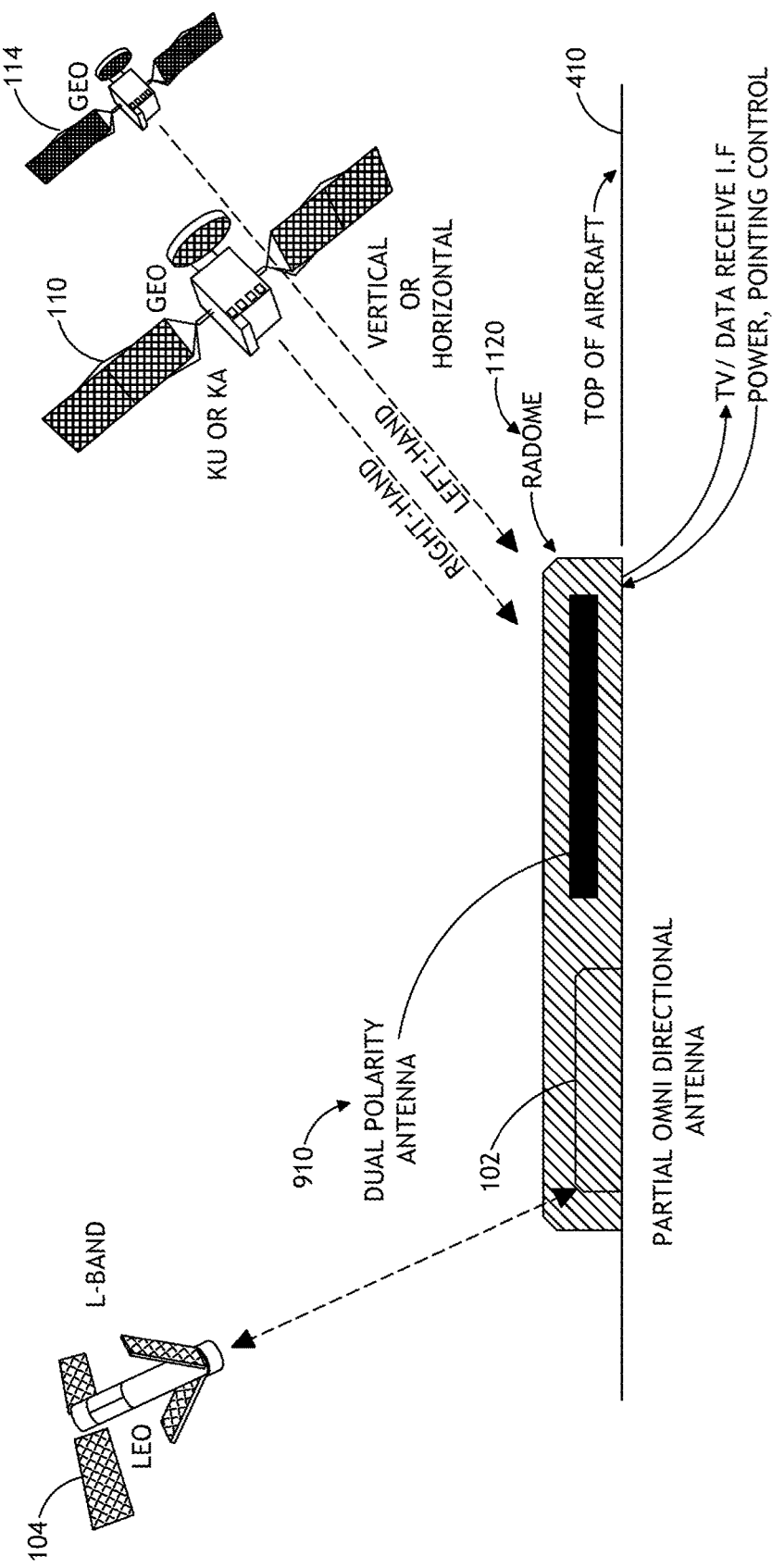

Referring now to FIGS. 10 and 11, exemplary configurations of embodied antenna systems are depicted. In some embodiments, the antenna system includes a dual-polarity GEO directional antenna 910 (as shown in FIG. 9) and at least one partial omni-directional LEO antenna 102.

In an exemplary configuration depicted in FIG. 10, the dual-polarity GEO directional antenna 910 and a particular partial omni-directional LEO antenna 102 are mounted to the aircraft in different locations. For example, the dual-polarity GEO directional antenna 910 can be mounted to a first location of the aircraft 410 (e.g., a first location on top of the fuselage of the aircraft 410) and covered by the radome 920, and the particular partial omni-directional LEO antenna 102 can be mounted to a second location of the aircraft 410 (e.g., a second location on top of the fuselage of the aircraft 410). Even though the dual-polarity GEO directional antenna 910 and the partial omni-directional LEO antenna 102 are mounted or attached in different locations of the aircraft 410, the dual-polarity GEO directional antenna 910 and the partial omni-directional LEO antenna 102 are both configured to be communicatively coupled on-board the aircraft 410 via a computing device (such as a split-proxy computing device 120).

In a further exemplary configuration depicted in FIG. 11, the dual-polarity GEO directional antenna 910 and a particular partial omni-directional LEO antenna 102 are mounted to the aircraft such that they are covered by the same radome 1120. For example, in some embodiments, the dual-polarity GEO directional antenna 910 and the particular partial omni-directional LEO antenna 102 can be installed on the aircraft 410 as a single antenna system assembly, which includes a radome covering both the GEO and LEO antennas. In other implementations, the dual-polarity GEO directional antenna 910 or the partial omni-directional LEO antenna 102 can be installed under an existing radome. The dual-polarity GEO directional antenna 910 and the partial omni-directional LEO antenna 102 are both configured to be communicatively coupled on-board the aircraft 410 via a computing device (such as a split-proxy computing device 120).

Figure 12A:
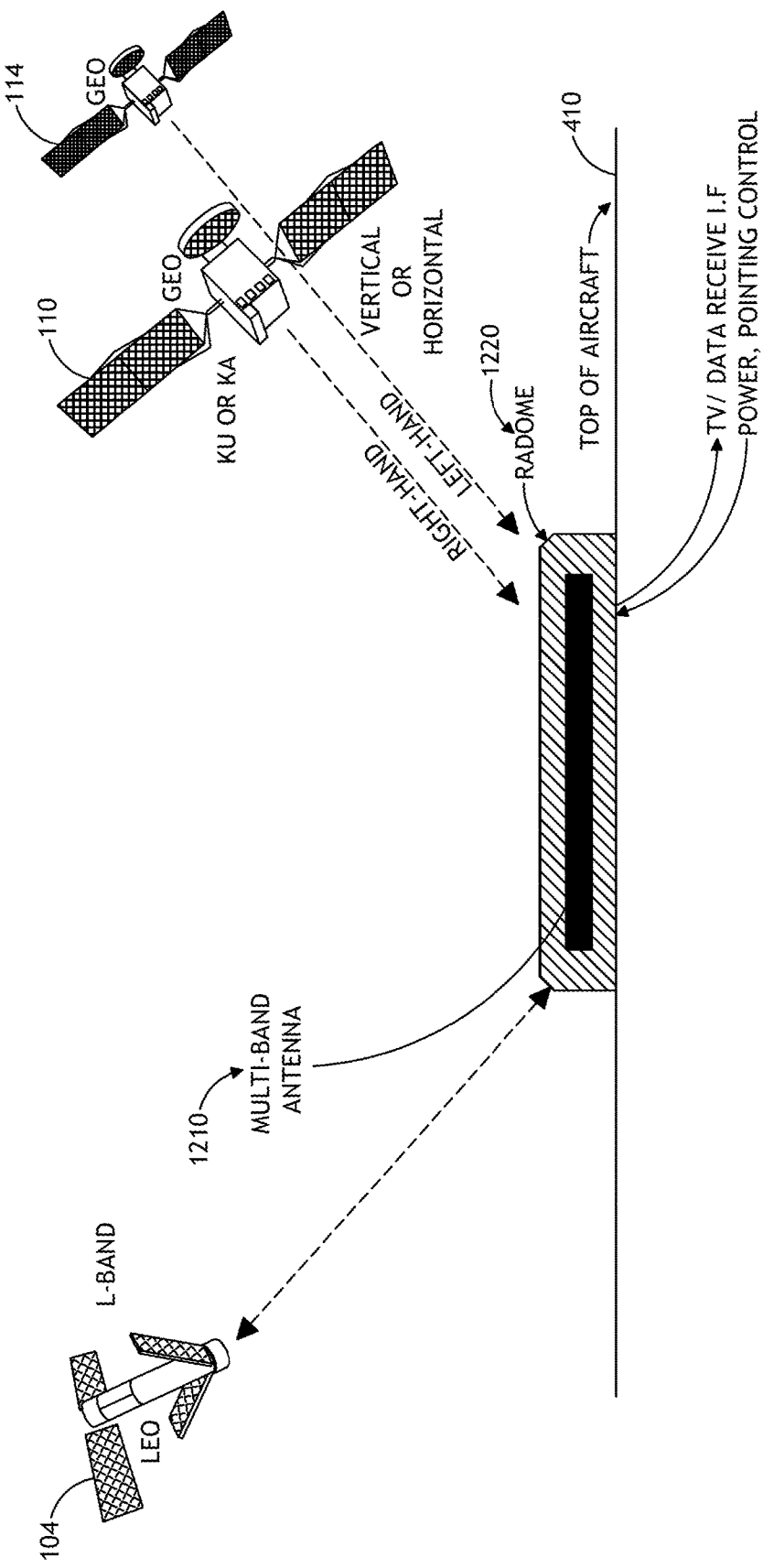
FIGS. 12A-C show exemplary views of embodiments which include a multi-band directional antenna.

Referring to FIG. 12A, an exemplary configuration of an embodied antenna system, which includes a multi-band GEO directional antenna 1210, is depicted. In some embodiments, the antenna system includes the multi-band GEO directional antenna 1210 and at least one partial omni-directional LEO antenna 102. In the exemplary configuration depicted in FIG. 12A, the multi-band GEO directional antenna is covered by a radome 1220. The multi-band GEO directional antenna 1210 may be implemented as a dual-band directional antenna, triple-band directional antenna, or the like. The multi-band GEO directional antenna 1210 is configured to receive multiple streams of signals simultaneously (or approximately simultaneously) or non-concurrently, wherein the multiple streams of signals at least includes a stream of signals on a first particular band (e.g., a particular portion of a band spectrum) and a stream of signals on a second particular band (e.g., a particular portion of a second band spectrum). Each of the streams of signals are received from a particular GEO satellite (such as GEO satellite 110 or 114); that is, a particular multi-band antenna is configured to receive multiple signals from multiple GEO satellites 110, 114 (e.g., receiving a stream of signals on a first band from a first GEO satellite 110 and receiving a stream of signals on a second band from a second GEO satellite 114). In some embodiments, the multi-band GEO directional antenna 1210 is configured for receiving streams (e.g., electromagnetic beams) of signals on a $K_u$ band and a $K_a$ band. In other implementations, the multi-band GEO directional antenna 1210 is configured for receiving streams of signals on two or more of an L band, a $K_u$ band, or a $K_a$ band. Furthermore, embodiments of the invention include the multi-band GEO directional antenna 1210 being configured to receive multiple streams of signals, wherein two or more of the signals are in portions of a same band spectrum. For example, in some embodiments the multi-band directional antenna is configured to receive two streams of signals, where the streams of signals are both in the $K_a$ band or both in the $K_u$ band; in some instances, this occurs when a first stream of signals of a particular band (e.g., $K_a$, $K_u$, or the like) has a first polarization orientation (e.g., left-hand polarized or vertical polarized, or the like) and a second stream of signals on the same particular band (e.g., $K_a$, $K_u$, or the like) has a second polarization orientation (e.g., right-hand polarized or horizontal polarized, or the like). While particular exemplary bands are disclosed, embodiments of the invention fully contemplate that a particular multi-band directional antenna can be implemented and configured to receive any suitable portion of any suitable band of signals from GEO satellites.

Figure 12B:
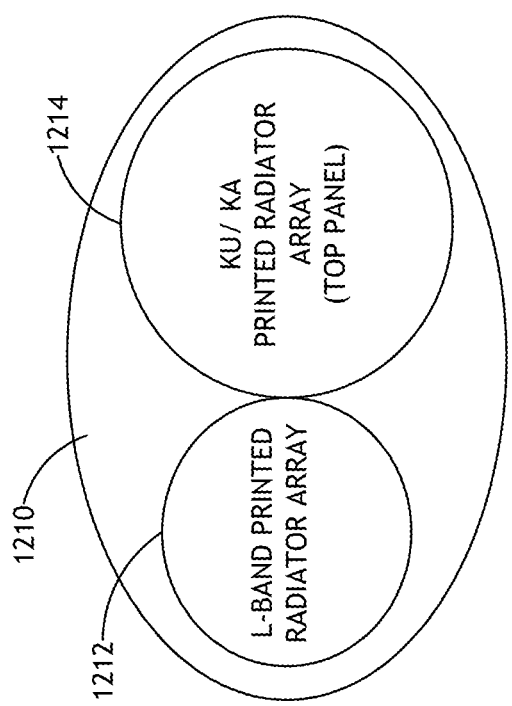
Figure 12C:
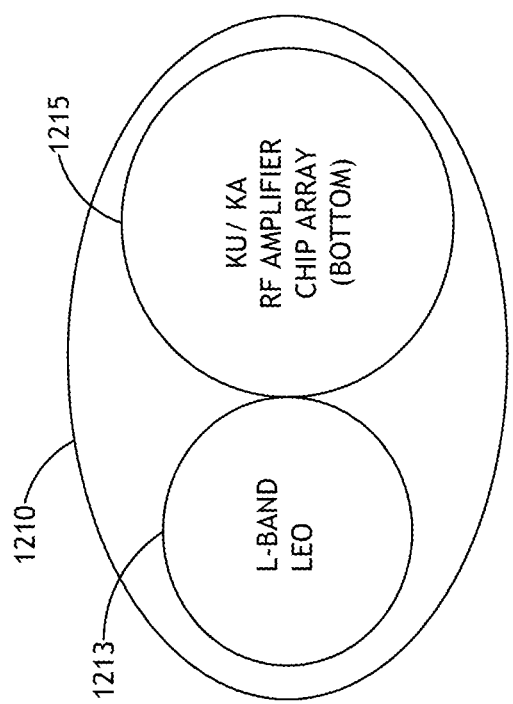

FIGS. 12B and 12C depict top and bottom views of the exemplary multi-band GEO directional antenna 1210 implemented as an ESA panel antenna. In embodiments of the invention, the multi-band GEO directional antenna 1210 implemented as an ESA panel antenna may be at least partially constructed of printed circuit board materials, dielectric materials, laminate materials, and/or bonding materials. In some embodiments, the multi-band GEO directional antenna 1210 implemented as an ESA panel antenna includes a plurality of printed radiator arrays, wherein each of the plurality of printed radiator arrays may be configured to receive beams from a portion of a different particular band (such as the L band, the Ka band, the Ku band, or any other band suitable to be received by an ESA antenna element).

Referring to FIG. 12B, the top view depicts dual printed radiator arrays 1212, 1214 of a printed circuit board of the multi-band GEO directional antenna 1210 implemented as an ESA panel antenna. Each of the dual printed radiator arrays 1212 is configured to receive a portion of a particular band of beams from GEO satellites. As exemplarily depicted in FIG. 12B, the multi-band GEO directional antenna 1210 includes an L band printed radiator array 1212 and a Ku/Ka band printed radiator array 1214. The L band printed radiator array 1212 includes antenna elements configured to receive signals in the L band. The Ku/Ka band printed radiator array 1214 includes antenna elements configured to receive signals in either or both of the Ku band and Ka band; for example, where the Ku/Ka band printed radiator array 1214 includes antenna elements configured to receive signals in the Ku band and Ka band, individual antenna elements configured to receive signals in either of the Ku or Ka band may be interspersed across the Ku/Ka band printed radiator array 1214.

In some embodiments, the printed circuit board of the multi-band GEO directional antenna 1210 may also include partial omni-directional LEO antenna, which is attached to, mounted to, or printed on the printed circuit board.

Referring to FIG. 12C, the bottom view of the exemplary multi-band GEO directional antenna 1210 depicts a plurality of radio frequency amplifier chip arrays 1213, 1215. The exemplary multi-band GEO directional antenna 1210 includes an L band radio frequency amplifier chip array 1213 and a Ku/Ka band radio frequency amplifier chip array 1215. The L band radio frequency amplifier chip array 1213 is configured to amplify signals received by the L band printed radiator array 1212 and output the amplified signal, which may be combined with other element outputs, amplified, filtered and presented as an intermediate frequency to other devices of the system (such as a radio 126, router 118, or split proxy computing device 120). The Ku/Ka band radio frequency amplifier chip array 1215 is configured to amplify signals received by the Ku/Ka band printed radiator array 1214 and output the amplified signals as an one or more intermediate frequencies to other devices of the system (such as a programmable receiver 112, decoder 118, or split proxy computing device 120).

Figure 13A:
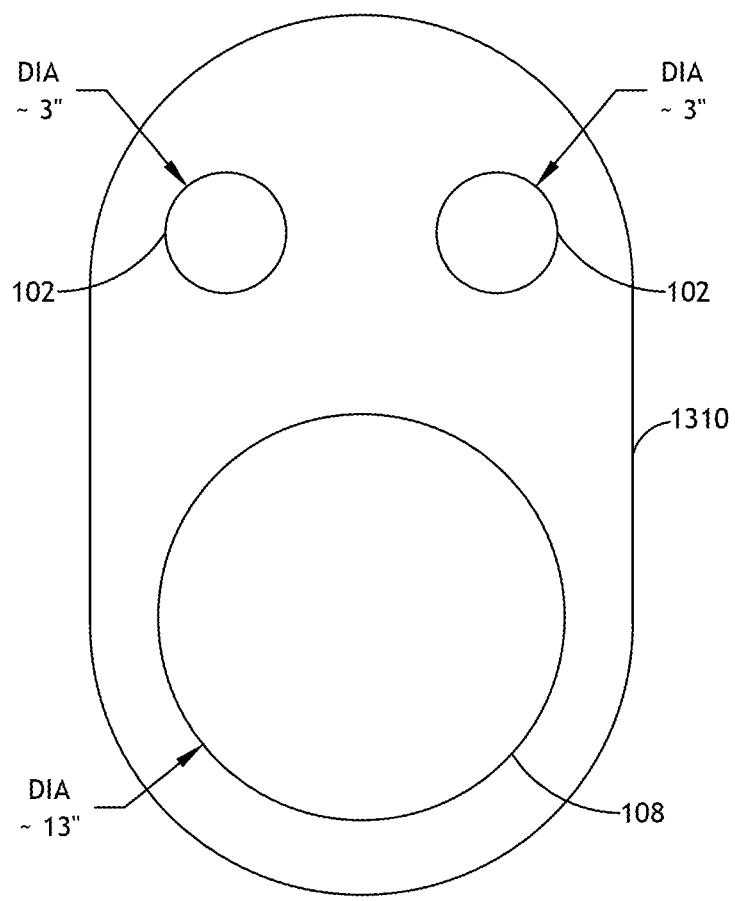
FIGS. 13A-13C show exemplary configurations of embodied antenna systems having at least one directional antenna and at least one partial omni-directional antenna.
Figure 13B:
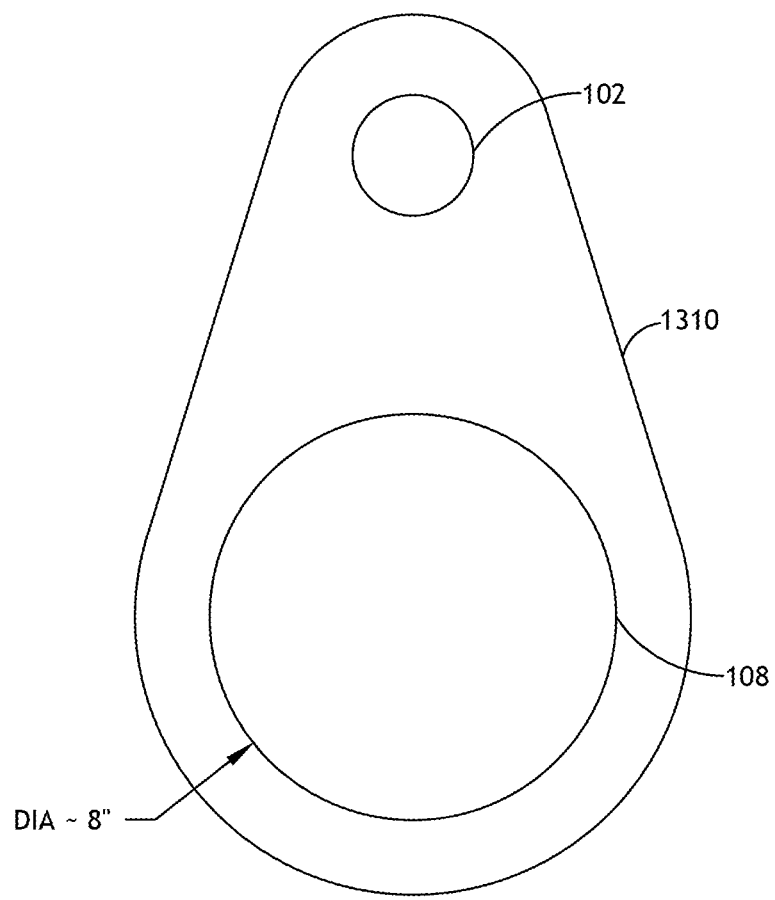
Figure 13C:
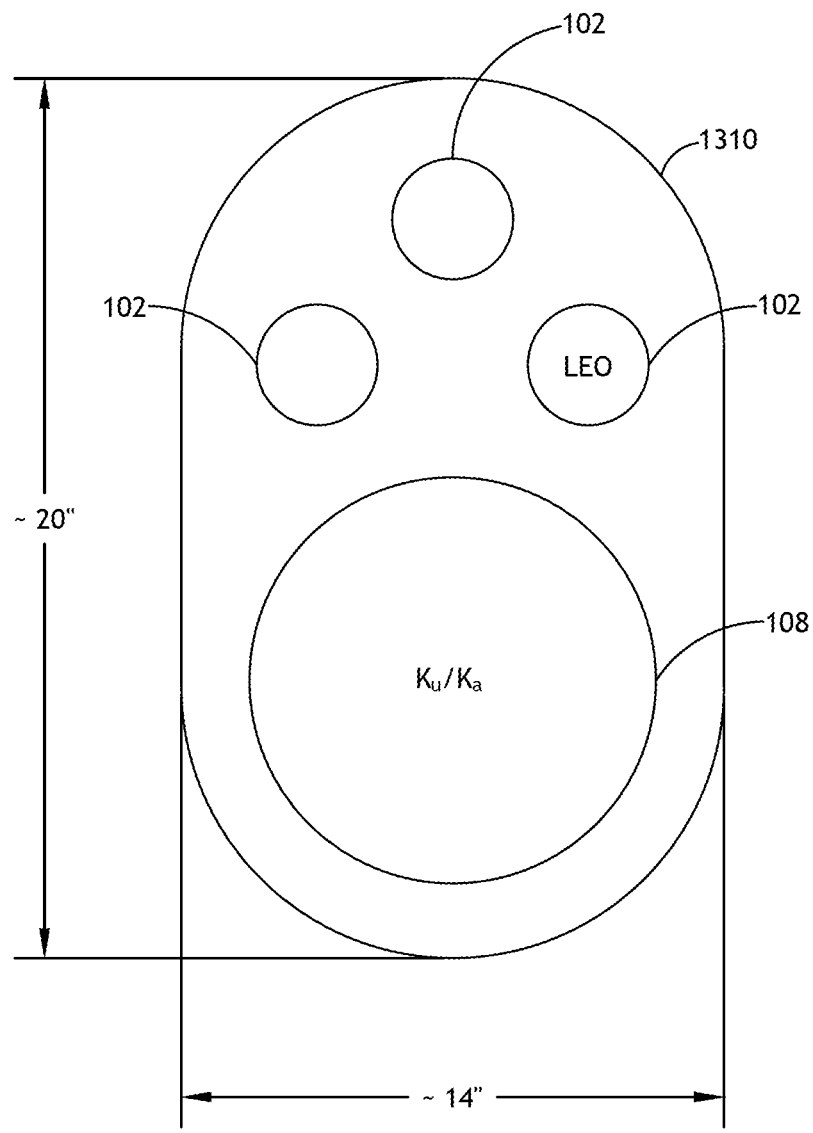

Referring now to FIGS. 13A-C, exemplary configurations of embodiments including at least one GEO directional antenna and at least one LEO partial omni-directional antenna are depicted. The at least one partial omni-directional antenna 102 and receiver system 108 of FIGS. 13A-C are configured to be covered by a radome 1310. Referring to FIG. 13A, an embodiment includes two partial omni-directional antennas 102 and a receiver system 108, which includes at least one GEO directional antenna. In an exemplary embodiment, the receiver system 108 has a diameter of approximately 13 inches and each of the two partial omni-directional antennas 102 has a diameter of approximately 3 inches.

Referring to FIG. 13B, an embodiment includes one partial omni-directional antenna 102 and a receiver system 108, which includes at least one GEO directional antenna. In the exemplary embodiment shown in FIG. 13B, the receiver system 108 has a diameter of approximately 8 inches, and each of the two partial omni-directional antennas 102 has a diameter of approximately 2.5-3 inches.

Referring to FIG. 13C, an embodied antenna system 1310 includes three partial omni-directional antenna 102 and a receiver system 108, which includes at least one GEO directional antenna. In the exemplary embodiment shown in FIG. 13C, the receiver system 108 has a diameter of approximately 6-12 inches, and each of the three partial omni-directional antennas 102 has a diameter of approximately 2-3 inches. The three partial omni-directional antenna 102 and the receiver system 108 are configured to occupy a space having dimensions of approximately 14 inches in width, approximately 20 inches in length, and 2-3 inches in height.

Figure 14:
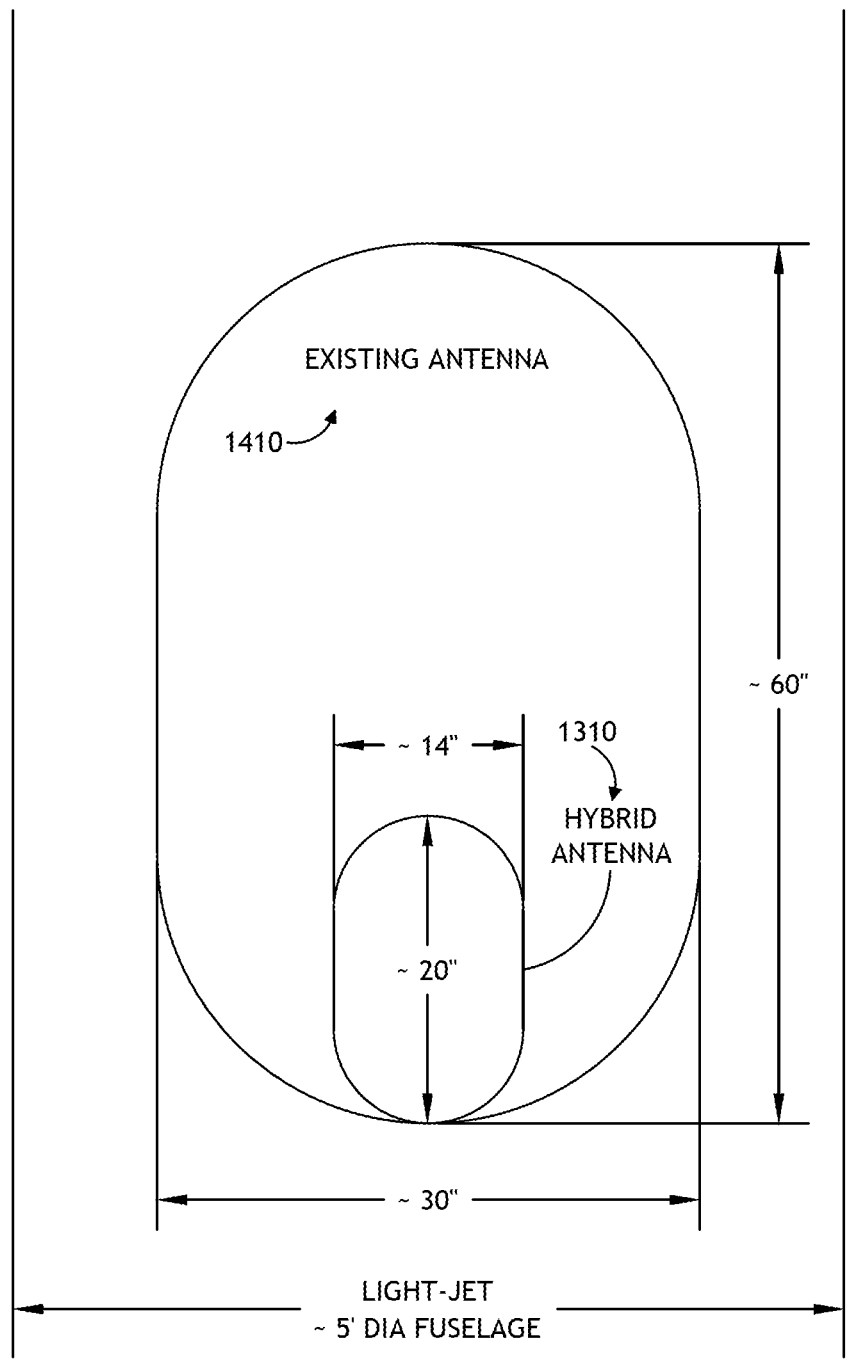
FIGS. 14-15 show comparative views of embodied antenna systems versus current antenna systems.
Figure 15:
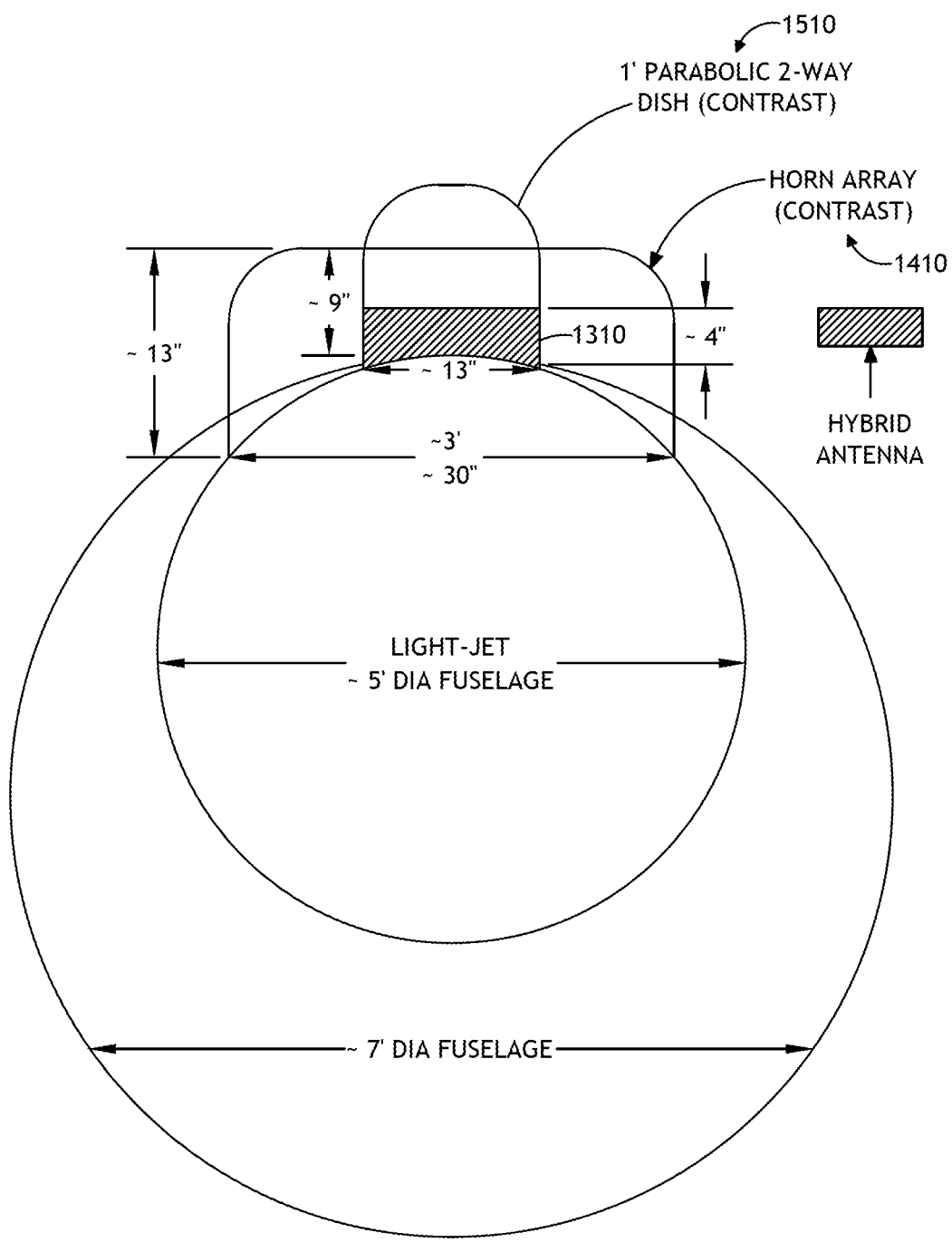

Referring now to FIGS. 14-15, comparative views of the existing antenna systems to the smaller size of the exemplarily embodied antenna system 1310 (of FIG. 13C) are depicted. FIG. 14 shows a comparative top view of the size of an existing antenna system 1410 to the smaller size of the exemplarily embodied antenna system 1310 (of FIG. 13C).

FIG. 15 shows comparative cross-sectional views of the size of existing antenna systems 1410, 1510 to the smaller size of the exemplarily embodied antenna system 1310 (of FIG. 13C). The existing receive-only antenna system (e.g., a horn array antenna system) 1410 requires a much greater footprint on top of an aircraft fuselage as compared to the embodied hybrid antenna system 1310. The existing antenna system 1410 is approximately 60 inches in length, 30 inches in width, and 9 inches in height. The further existing antenna system (e.g., a parabolic two dish antenna system) 1510 is approximately 13 inches in width and 13 inches in height. In contrast, the exemplary embodied receive/transmit hybrid antenna system 1310 can be implemented with a much smaller size of approximately 20 inches in length, 14 inches in width, and 4 inches in height. The reduced size of embodiments of the invention greatly reduces drag on vehicles and allows the system to be installed on vehicles of nearly any size.

Figure 16:
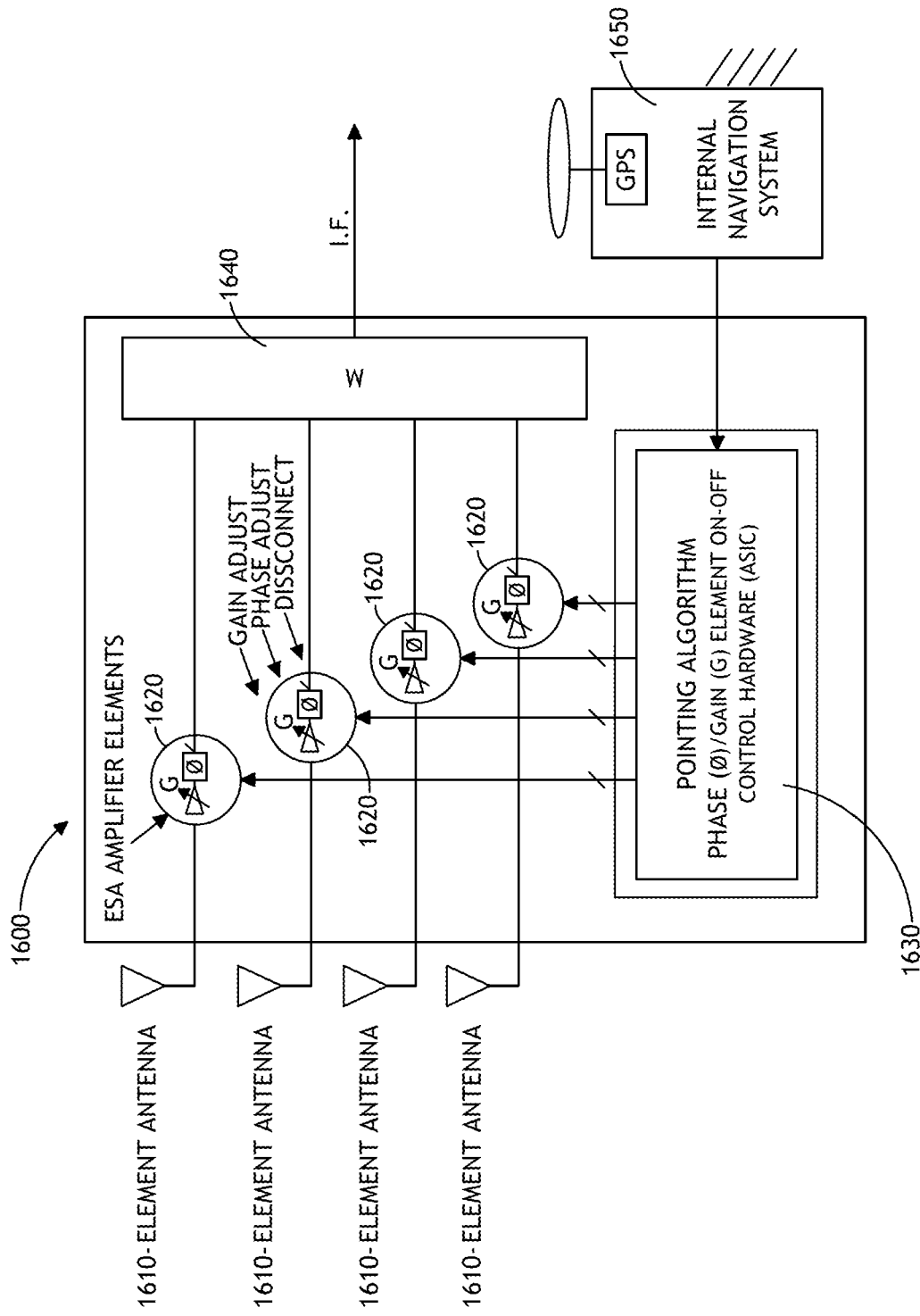
FIG. 16 shows a diagram of components of an electronically scanned array (ESA) panel antenna.

Referring now to FIG. 16, a diagram of an exemplary ESA panel antenna 1600 configured to be implemented in embodiments of the invention is depicted. In some embodiments, the ESA panel antenna 1600 may be implemented as one or more RF amplifier integrated circuits. In further embodiments, the ESA panel antenna 1600 may be implemented as a printed circuit board with a plurality of elements mounted on, attached to, or incorporated on the printed circuit board. The ESA panel antenna 1600 includes a plurality of antenna elements 1610 (such as hundreds, thousands, or millions of antenna elements), a plurality of amplifier elements 1620, at least one control hardware 1630, and at least one combiner 1640. Each antenna element 1610 is configured to receive signals over one or more particular bands and pass a signal to a particular corresponding amplifier element 1620. Each amplifier element is configured to amplify the signal from a particular corresponding antenna element 1610 and pass the amplified signal to the combiner 1640. For example, the amplifier element 1620 can amplify the signal by adjusting (e.g., increasing) the amplitude of the signal. The amplifier element 1620 is further configured to adjust a phase of the signal received from the antenna element 1610 as it passes the signal to the combiner 1640. In some embodiments, the amplifier element 1620 is further configured to be disconnected (such as by opening a circuit or grounding the signal received from the antenna element 1610).

Additionally, the ESA panel antenna 1600 includes control hardware 1630 configured to control individual amplifier elements 1620 and/or individual antenna elements 1610. The control hardware 1630 can comprise a controller, processor, or integrated circuit configured to execute instructions. For example, the control hardware 1630 can be configured to control the amount of amplitude gain adjustment performed by particular amplifier elements 1620, control the amount of phase adjustment performed by particular amplifier elements 1620, or connect/disconnect or enable/disable particular amplifier elements 1620 (e.g., turning particular amplifier elements 1620 on/off or disabling particular amplifier element outputs). The control hardware 1630 is configured to individually adjust the phase of the amplifier elements 1620 such that the amplified signals received by the combiner 1640 are received with approximately the same phase. The control hardware 1630 can be implemented as an integrated circuit, such as an application specific integrated circuit (ASIC) or field programmable gate array (FPGA). In some embodiments, the control hardware 1630 may be configured to determine whether a signal to noise ratio of a signal received from a particular amplifier element 1610 is above a threshold value. For example, if the control hardware 1630 determines that the signal to noise ratio of a signal is estimated to be or is greater than or equal to the threshold value, the control hardware 1630 enables, activates, turns on, or maintains an enabled or activated state for the amplifier element 1620; likewise, if the control hardware 1630 determines that the signal to noise ratio of the signal is less than the threshold value, the control hardware 1630 disables, deactivates, turns off, or maintains a disabled or deactivated state for the amplifier element 1620.

In some embodiments, the control hardware 1630 is configured to perform a pointing algorithm to electronically steer (in one or both of elevation and azimuth components) the array of antenna elements of the ESA panel antenna 1600 to receive a beam from a particular satellite. The pointing algorithm may be an adaptive algorithm, such that, for example, the adaptive algorithm is repeatedly performed to accommodate changing positions and orientations of the aircraft relative to the location of a satellite (which may also be moving). Performing the pointing algorithm may include electronically steering the array of antennas of the ESA panel antenna to receive a beam from a satellite of a particular location. Performing the pointing algorithm may include receiving azimuth and elevation inputs from the aircraft inertial navigation system (INS) 1650. In some implementations, the aircraft inertial navigation system 1650 is included with, incorporated in, or attached to the ESA panel antenna 1600, while in other implementations, the aircraft inertial navigation system 1650 is located elsewhere on the aircraft and communicatively coupled to the ESA panel antenna 1600. Repeatedly (or continuously) performing the pointing algorithm allows the ESA panel antenna 1600 to maintain an aligned (e.g., correctly pointed or aimed) gain pattern of the ESA panel antenna 1600 with an incoming beam from a satellite having a particular position or trajectory. Additionally, in some embodiments, the control hardware 1630 is configured to perform a plurality of pointing algorithms simultaneously, approximately simultaneously, or in some alternating sequence to independently and electronically steer (in one or both of elevation and azimuth components) multiple portions of the array of antenna elements of the ESA panel antenna 1600 to receive beams from one or more particular satellites, wherein the ESA panel antenna 1600 is implemented as a multi-polarity ESA panel antenna or a multi-band ESA panel antenna.

Additionally, the ESA panel antenna 1600 includes the combiner 1640. The combiner 1640 is configured to receive a plurality of amplified signals from amplifier elements 1620 and combine the plurality of amplified signals into a single intermediate frequency (or a plurality of intermediate frequencies if the ESA panel antenna 1600 is implemented as a multi-polarity ESA panel antenna or a multi-band ESA panel antenna). The combiner 1650 then passes the intermediate frequency to other devices of the antenna system or vehicle communications system, such as a programmable receiver 112, decoder 118, or split proxy computing device 120.

In some embodiments, the ESA panel antenna 1600 can include other functionality or portions of functionality, such as the functionality of a decoder, programmable receiver, router, GPS antenna, or split proxy computing device.

Figure 17A:
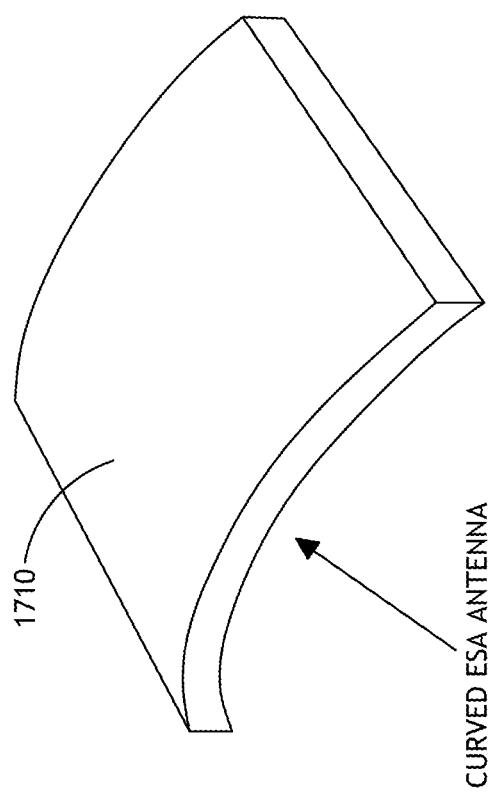
FIGS. 17A-C show diagrams of a curved ESA antenna.
Figure 17B:
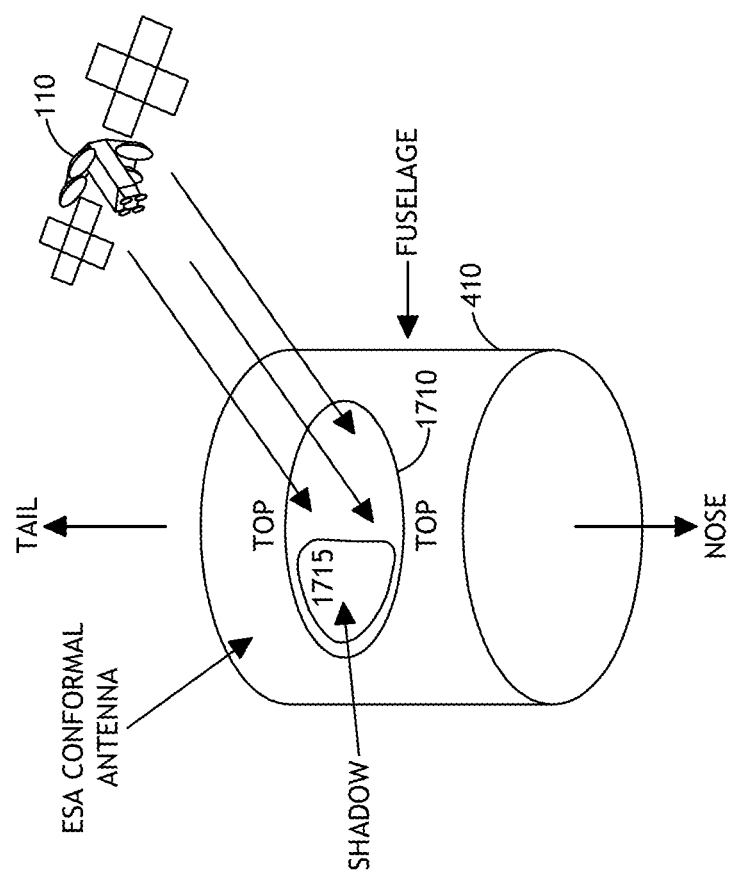
Figure 17C:
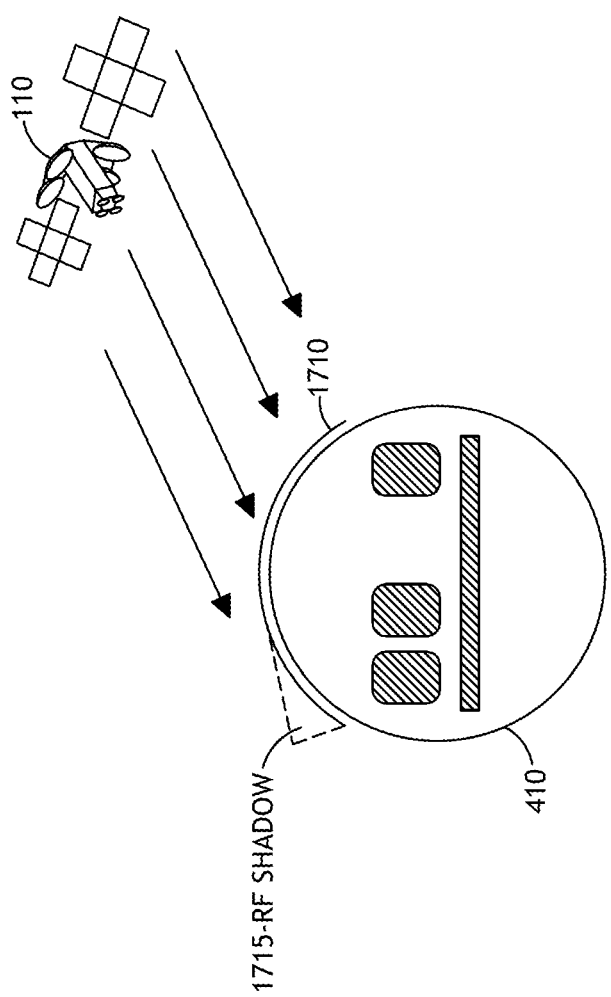

Referring now to FIGS. 17A-C, exemplary embodiments of the invention having a curved ESA antenna 1710 are depicted. Embodiments of the invention include one or more curved ESA antennas 1710 as part of the GEO antenna and communicatively part of the split proxy system also having connectivity to the LEO system. The curved ESA antenna 1710 is configured to wrap around the fuselage for improved view of the satellites when the aircraft banks and turns. The curved ESA antenna 1710 may be implemented as one or more integrated circuits or as a printed circuit board with a plurality of elements mounted on, attached to, or incorporated on the printed circuit board. For example, the curved ESA antenna 1710 can be implemented as including one or more of the features or components of the exemplary ESA panel antenna 1600 of FIG. 16 and the description corresponding thereto. In some embodiments, the curved ESA antenna includes a curved printed circuit board, wherein the curved printed circuit board includes a plurality of conductive pathways and a non-conductive substrate molded or formed with one or more curvatures such that the printed circuit board approximately conforms to a desired curvature of a particular vehicle.

In some embodiments, one or more curvatures of an underside of the curved ESA antenna 1710 correspond to one or more curvatures of a portion of a surface of a vehicle. For example, as depicted in FIGS. 17A-C, a curvature of the underside of the curved ESA antenna 1710 conforms to the curvature of a portion of a surface of an aircraft's 410 fuselage.

In some embodiments of the invention, control hardware of the curved ESA antenna 1710 is configured enable and disable amplifier elements of the curved ESA antenna 1710. For example, as shown in FIG. 17B, control hardware of the curved ESA antenna 1710 can be configured to disable particular amplifier elements of the curved ESA antenna 1710 when the particular amplifier elements are in a radio frequency shadow 1715 of a beam of a transmitting satellite 110, and likewise, enable particular amplifier elements of the curved ESA antenna 1710 when the particular amplifier elements are not in a radio frequency shadow 1715. For example, the control hardware of the curved ESA antenna 1710 can be configured to detect signal strength and/or compute signal to noise ratios for each amplifier element of the curved ESA antenna 1710. The control hardware of the curved ESA antenna 1710 may then enable, activate, or maintain an active state of the amplifier if the detected or computed signal strength or signal to noise ratio is greater than or equal to a threshold value. In a similar manner, the control hardware of the curved ESA antenna 1710 may disable, deactivate, or maintain a disabled/deactivated state for particular amplifier elements of the curved ESA antenna 1710 if the detected or computed signal strength or signal to noise ratio is less than a threshold value. In further embodiments, the control hardware of the curved ESA antenna 1710 can enable or disable particular amplifier elements based upon a position or trajectory of a satellite in relation to orientations of individual antenna elements; for example, the control hardware of the curved ESA antenna 1710 may determine that individual antenna elements of the curved ESA antenna 1710 are currently pointed away from a particular satellite and disable particular corresponding amplifier elements. In some embodiments, disabling or enabling particular amplifier elements may be based at least in part upon internal navigation system information. Furthermore, the control hardware of the curved ESA antenna 1710 can adaptively determine which amplifier elements are to be enabled or disabled at any given time.

In some embodiments of the invention, the ESA panel antenna or curved ESA antenna 1710 (configured to receive signals from any satellite over any suitable band) can include a system and method for disabling antenna array elements and/or amplifier elements that momentarily do not constructively contribute to reception of a signal of a particular satellite of interest. In embodiments of the invention, the ESA panel antenna or curved ESA antenna 1710 includes the ability to turn-off (disable, shut down) any one or more (group) of these small amplifier elements and/or antenna elements based on estimated or measured performance at any time. That is, a curved ESA antenna 1710, which is conformal to the curvature or top of an aircraft fuselage (or other portion of another vehicle), can significantly or slightly wrap over the top of the aircraft. Consequently, however, a portion of the curved ESA antenna 1710 can become shadowed (see, for example radio frequency shadow 1715) by the fuselage itself because the particular satellite of interest no longer has an unobstructed line of sight with all of the surface of the curved ESA antenna 1710. The occurrence of radio frequency shadows 1715 can be particularly frequent when the satellite of interest is lower in the sky because antenna elements (and corresponding amplifier elements) of the curved ESA antenna 1710 will be more prone to losing line-of-sight with the particular desired satellite. When particular amplifier elements and/or antenna elements of the curved ESA antenna 1710 fail to have an adequate line of sight or have a signal strength with a signal to noise ratio less than a threshold value, the system (such as control hardware of the curved ESA antenna 1710) can disconnect or disable the particular amplifier elements such that the particular amplifier elements do not contribute signal power to the amplifier combiner(s). By disabling particular amplifier elements and re-enabling particular amplifier elements based on direct visibility to the satellite or based on their signal to noise contribution, the overall curved ESA antenna performs better because the noise contribution from unused amplifier elements is reduced.

In some embodiments, the system and method for disabling array elements are controlled by an open-loop feedback control system which estimates the line of sight (element interference) based on the aircraft's position information (such as inertial navigation system position information and/or GPS position information). In further embodiments, the system and method includes estimating mechanical interference from the fuselage. Additionally, the ESA curved antenna 1710 can alternatively or concurrently be controlled by closed-loop signal to noise measurements detected in the curved ESA antenna 1710, antenna elements, or in the receiver (where amplifier signal to noise ratio is measured by on-board circuits). Particular amplifier elements can be disabled based upon signal to noise ratios below a threshold value. Embodiments which include the method for disabling particular amplifier elements improve overall signal to noise ratios and improve gain to temperature ratios for the antenna system.

Additionally, in some embodiments, each amplifier element can be individually phased. Embodiments with individually phased amplifier elements provide improved gain response which accounts for the curvature of the curved ESA antenna 1710. Each amplifier element can be individually phased based upon its position and/or orientation in relation to a particular satellite, its position and orientation in relation to other amplifier and/or antenna elements of the curved ESA antenna 1710, the phase of other amplifier elements of the curved ESA antenna 1710, and a curvature slope and/or normal vector relative to a position of the particular amplifier element on the curved ESA antenna 1710.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An antenna system for a small to mid-sized aircraft, comprising:
    at least one antenna of the small to mid-sized aircraft, each of the at least one antenna being configured to send signals to and receive signals from one or more non-geostationary satellites;
    at least one directional antenna of the small to mid-sized aircraft, each of the at least one directional antenna being configured to receive signals from one or more geostationary satellites, wherein a particular directional antenna of the at least one directional antenna comprises an electronically scanned array panel; and
    a computing device of the small to mid-sized aircraft, the computing device comprising a processor, wherein the computing device is a split proxy computing device configured to split inbound and outbound communications among two or more satellite systems, wherein the split proxy computing device is further configured to:
        receive inbound communications via the at least one antenna from the one or more non-geostationary satellites,
        receive inbound communications via the at least one directional antenna from the one or more geostationary satellites, and
        output outbound communications to the at least one antenna for transmission to the one or more non-geostationary satellites,
    wherein the at least one antenna and the at least one directional antenna are configured to be communicatively coupled to the computing device on-board the small to mid-sized aircraft.

2. The system of claim 1, wherein the processor comprises a network processor.

3. The system of claim 1, wherein the antenna system is configured to operate as a two-way communication system by sending signals from the at least one antenna to one or more non-geostationary satellites and by receiving signals by the at least one directional antenna from one or more geostationary satellites.

4. The system of claim 1, wherein a diameter of the electronically scanned array panel is less than 0.35 meters.

5. The system of claim 1, wherein a particular antenna of the at least one antenna comprises a partial omni-directional antenna.

6. The system of claim 5, wherein the partial omni-directional antenna of the at least one antenna is configured to send and to receive L band signals.

7. The system of claim 6, wherein the particular directional antenna of the at least one directional antenna comprises a dual-band antenna.

8. The system of claim 7, wherein the dual-band antenna of the at least one directional antenna is configured to receive $K_a$ band signals and $K_u$ band signals.

9. The system of claim 1, further comprising:
at least one positionable table of the small to mid-sized aircraft, the at least one positionable table supporting one or more of the at least one directional antenna, the at least one positional table being configured to change a positional orientation of the one or more of the at least one directional antenna supported by the at least one positionable table.

10. The system of claim 1, wherein the particular directional antenna of the at least one directional antenna includes a tilt mechanism configured to change an orientation of the particular directional antenna.

11. The system of claim 1, wherein the particular directional antenna of the at least one directional antenna is a statically-mounted pointable antenna.

12. The system of claim 1, wherein the at least one directional antenna includes at least two directional antennae, wherein each of the at least two directional antennae is configured to receive signals from one or more geostationary satellites.

13. The system of claim 12, wherein the at least two directional antennae further comprise at least two electronically scanned array panels, the at least two electronically scanned array panels including a first electronically scanned array panel and a second electronically scanned array panel, wherein the first electronically scanned array panel and the second electronically scanned array panel are configured such that a plane extending from a surface of the first electronically scanned array panel intersects a plane extending from a surface of the second electronically scanned array panel.

14. The system of claim 1, wherein the at least one antenna includes at least two antennae, wherein each of the at least two antennae is configured to send signals to and receive signals from one or more non-geostationary satellites.

15. The system of claim 14, wherein the at least two antennae are included in or on a same circuit board.

16. The system of claim 1, further comprising:
a radome.

17. The system of claim 16, wherein the radome is configured to cover one or more of the at least one directional antenna.

18. The system of claim 16, wherein the radome is configured to cover one or more of the at least one antenna and one or more of the at least one directional antenna.

19. The system of claim 16, wherein the radome is configured to enclose a volume between the radome and a surface of the small to mid-sized aircraft.

20. The system of claim 16, wherein a width of the radome is less than 0.36 meters.

21. The system of claim 16, wherein length of the radome is less than 0.51 meters.

22. The system of claim 16, wherein a height of the radome is less than 0.11 meters.

23. The system of claim 16, wherein a height of the radome is less than 0.07 meters.

24. The system of claim 1, wherein the particular directional antenna of the at least one directional antenna is configured to receive signals having a plurality of polarization orientations at least approximately simultaneously.

25. The system of claim 1, wherein the particular directional antenna of the at least one directional antenna includes circuits configured to receive signals having a first polarization orientation and signals having a second polarization orientation.

26. The system of claim 1, wherein the one or more non-geostationary satellites comprise one or more low earth orbit satellites.

27. The system of claim 1, further comprising:
at least one of an air-to-ground communications system or a cellular communications system.

28. The system of claim 1, wherein a particular antenna of the at least one antenna is configured to report vehicle position data to at least one particular non-geostationary satellite of the one or more non-geostationary satellites, wherein the at least one particular non-geostationary satellite is configured for routing the vehicle position data to one or more network operations centers communicatively coupled to the one or more geostationary satellites, wherein the vehicle position data is for directing one or more spot beams of the one or more geostationary satellites.

29. An antenna system for a small to mid-sized aircraft, comprising:
at least one antenna of the small to mid-sized aircraft, each of the at least one antenna being configured to send signals to and receive signals from one or more non-geostationary satellites;
at least one multi-band directional antenna, each of the at least one multi-band directional antenna being configured to receive signals from one or more first-band geostationary satellites over a first band and to receive signals from one or more second-band geostationary satellites over a second band, wherein a particular multi-band directional antenna of the at least one multi-band directional antenna comprises an electronically scanned array panel; and
a computing device of the small to mid-sized aircraft, the computing device comprising a processor, wherein the computing device is a split proxy computing device configured to split inbound and outbound communications among two or more satellite systems, wherein the split proxy computing device is further configured to:
receive inbound communications via the at least one antenna from the one or more non-geostationary satellites,
receive inbound communications via the at least one multi-band directional antenna from the one or more geostationary satellites, and
output outbound communications to the at least one antenna for transmission to the one or more non-geostationary satellites,
wherein the at least one antenna and the at least one multi-band directional antenna are configured to be communicatively coupled to the computing device on-board the small to mid-sized aircraft.

30. The system of claim 29, wherein the particular multi-band directional antenna of the at least one multi-band directional antenna comprises a dual-band directional antenna.

31. The system of claim 29, wherein the particular multi-band directional antenna of the at least one multi-band directional antenna includes a single electronically scanned array panel.

32. The system of claim 29, wherein the first band comprises a $K_a$ band, a $K_u$ band, or an L band, and wherein the second band comprises a $K_a$ band, a $K_u$ band, or an L band, the first band different from the second band.

33. The system of claim 29, wherein the at least one multi-band directional antenna is further configured to receive signals having a plurality of polarization orientations at least approximately simultaneously.

34. The system of claim 29, wherein the particular multi-band directional antenna of the at least one directional antenna includes circuits configured to receive signals having a first polarization orientation and signals having a second polarization orientation.

35. An antenna system for a small to mid-sized aircraft, comprising:
- at least one antenna of the small to mid-sized aircraft, each of the at least one antenna being configured to send signals to and receive signals from one or more non-geostationary satellites;
- at least one directional antenna of the small to mid-sized aircraft, each of the at least one directional antenna being configured to receive signals from one or more geostationary satellites, wherein a particular directional antenna of the at least one directional antenna comprises a curved electronically scanned array panel, the curved electronically scanned array panel including a plurality of amplifier elements distributed over an area of the curved electronically scanned array panel, the curved electronically scanned array panel being configured to receive signals from the one or more geostationary satellites, wherein one or more curvatures of an underside of the curved electronically scanned array panel correspond to one or more curvatures of a portion of a surface of the small to mid-sized aircraft; and
- a computing device of the small to mid-sized aircraft, the computing device comprising a processor, wherein the computing device is a split proxy computing device configured to split inbound and outbound communications among two or more satellite systems, wherein the split proxy computing device is further configured to:
  - receive inbound communications via the at least one antenna from the one or more non-geostationary satellites,
  - receive inbound communications via the at least one directional antenna from the one or more geostationary satellites, and
  - output outbound communications to the at least one antenna for transmission to the one or more non-geostationary satellites,
- wherein the at least one antenna and the at least one directional antenna are configured to be communicatively coupled to the computing device on-board the small to mid-sized aircraft.

36. The antenna system of claim 35, wherein one or more of the plurality of amplifier elements is configured to be enabled and disabled.

37. The antenna system of claim 35, wherein one or more of the plurality of amplifier elements is configured to be enabled and disabled based upon a gain of a signal received relative to a signal-to-noise ratio threshold.

* * * * *